(12) United States Patent
Akiyama

(10) Patent No.: US 8,179,600 B2
(45) Date of Patent: May 15, 2012

(54) SCREEN AND METHOD OF MANUFACTURING SCREEN

(75) Inventor: Koichi Akiyama, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 174 days.

(21) Appl. No.: 12/546,971

(22) Filed: Aug. 25, 2009

(65) Prior Publication Data

US 2010/0067107 A1     Mar. 18, 2010

(30) Foreign Application Priority Data

Sep. 16, 2008 (JP) ................................. 2008-236109
Jul. 27, 2009 (JP) ................................. 2009-173990

(51) Int. Cl.
    G03B 21/60    (2006.01)
(52) U.S. Cl. ........................................ 359/459; 359/443
(58) Field of Classification Search .................. 359/449,
    359/452, 454–457, 296, 443–444, 459–460,
    359/707; 348/789
    See application file for complete search history.

(56) References Cited

U.S. PATENT DOCUMENTS

| | | | | |
|---|---|---|---|---|
| 3,191,495 A | * | 6/1965 | Miller | 359/455 |
| 3,964,822 A | * | 6/1976 | Yamashita | 359/443 |
| 4,732,441 A | * | 3/1988 | Cheng | 359/451 |
| 6,894,835 B2 | * | 5/2005 | Ohsako et al. | 359/449 |
| 7,864,420 B2 | * | 1/2011 | Shinbo et al. | 359/459 |
| 2009/0021828 A1 | * | 1/2009 | Shinbo et al. | 359/443 |

FOREIGN PATENT DOCUMENTS

| | | |
|---|---|---|
| GB | 2 413 860 A | 11/2005 |
| JP | A-4-191727 | 7/1992 |
| JP | A-5-11348 | 1/1993 |
| JP | A-6-75301 | 3/1994 |
| JP | A-6-258717 | 9/1994 |
| JP | 1999142975 | * 5/1999 |
| JP | A-11-142975 | 5/1999 |
| JP | A-2004-38002 | 2/2004 |
| JP | A-2005-215396 | 8/2005 |
| JP | A-2006-23693 | 1/2006 |
| JP | A-2006-65164 | 3/2006 |
| JP | A-2006-216162 | 8/2006 |
| JP | A-2006-259643 | 9/2006 |

* cited by examiner

Primary Examiner — Clayton E Laballe
Assistant Examiner — Kevin Butler
(74) Attorney, Agent, or Firm — Oliff & Berridge, PLC

(57) ABSTRACT

A screen includes: a plurality of three-dimensional shape units disposed two-dimensionally on a front side of a screen substrate; a reflecting film formed at least on an area corresponding to projection light entering a surface of the plurality of the three-dimensional shape units of the screen substrate; and a light absorbing film formed on an area corresponding to outside light entering the surface of the plurality of the three-dimensional shape units, wherein at least a part of the light absorbing film is formed so as to overlap a part of the reflecting film on the front side of the reflecting film.

17 Claims, 14 Drawing Sheets

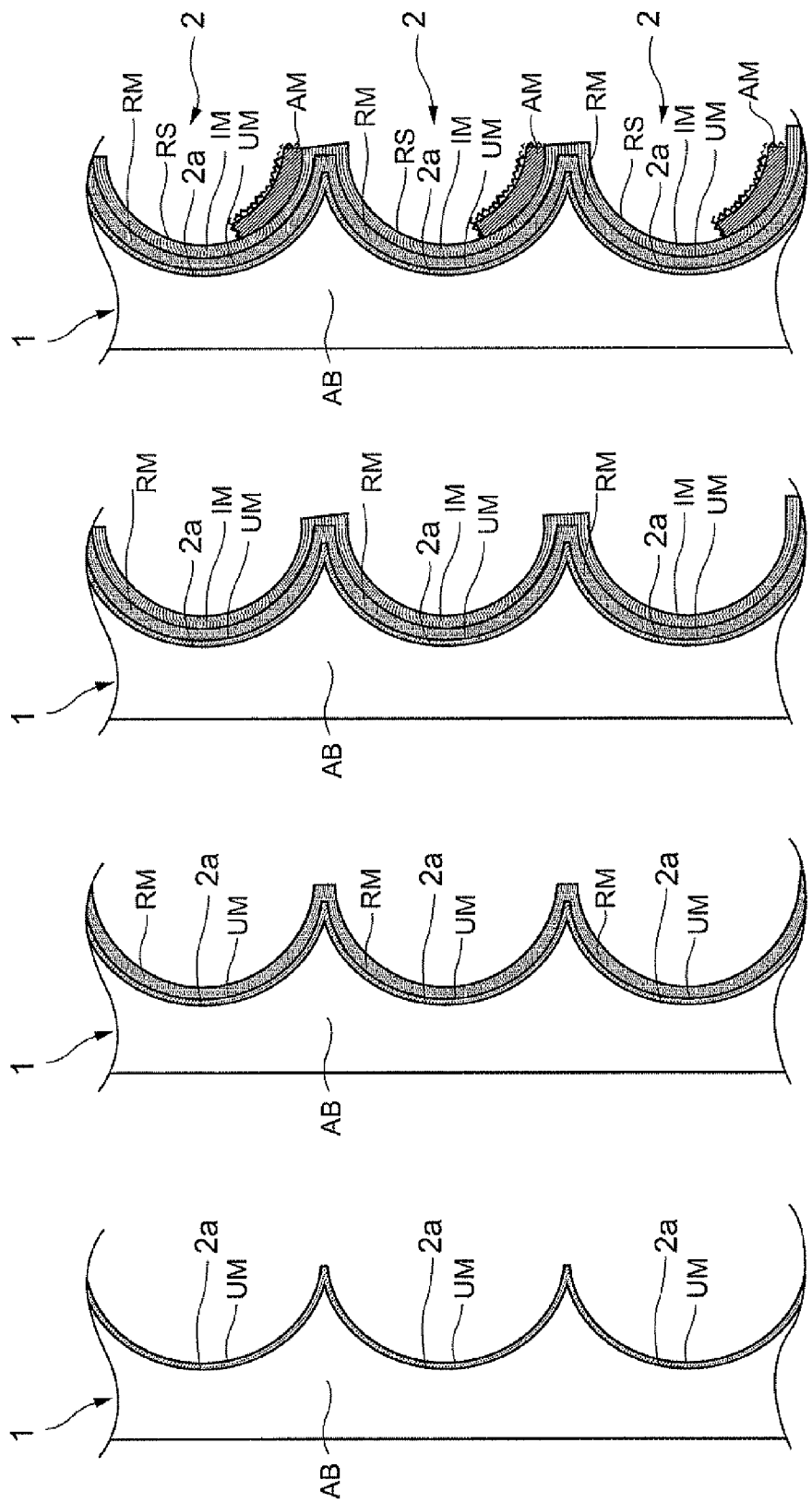

SCREEN AND METHOD OF MANUFACTURING SCREEN

BACKGROUND

1. Technical Field

The present invention relates to a screen for reflecting projection light from a projection apparatus such as a projector disposed in front thereof to provide a projection image, and a method of manufacturing the screen.

2. Related Art

As a reflective screen for reflecting a projection image, there is known a screen, for example, for making it possible to observe the projection image, which is projected obliquely from below the screen, in front thereof, and provided with a number of convex unit shape sections two-dimensionally arranged on a screen substrate (see JP-A-2006-215162). In this screen, a reflecting surface for the projection light is formed on a part of the surface of each of the unit shape sections in accordance with the projection position from a projection apparatus such as a projector, and it is possible to block the outside light from above entering an area where the reflecting surface is not formed.

However, in order for providing the reflecting surface partially at a desired position on the screen substrate in accordance with the oblique projection from below, there is required sophisticated control of ejecting a film-forming material obliquely toward the screen substrate in the formation of the film for forming the reflecting surface. Further, there is also a possibility that the control of precisely adjusting the thickness of the film of at least one layer for forming the reflecting surface is required in order for providing the reflecting surface with a desired reflective property.

Further, in order for processing unnecessary components such as the outside light entering from a portion other than the reflecting surface, it is required to use a material having optical transparency or a light absorbing property as a material of the screen substrate. In the case of using, for example, a material with optical transparency as the screen substrate, in order for absorbing the light transmitted through the screen substrate so as not to go back to the observer, a process of blacking out the entire back surface, for example, is further required.

SUMMARY

An advantage of some aspects of the invention is to provide a screen having a structure, which can be formed with relative ease without requiring performing the complicated control for forming the reflecting surface, and is capable of appropriately reflecting the projection light and suppressing the reflection of the outside light, and a method of manufacturing the screen.

A screen according to an aspect of the invention includes a plurality of three-dimensional shape units disposed two-dimensionally on a front side of a screen substrate, a reflecting film formed at least on an area corresponding to projection light entering a surface of the plurality of the three-dimensional shape units of the screen substrate, and a light absorbing film formed on an area corresponding to outside light entering the surface of the plurality of the three-dimensional shape units, and at least a part of the light absorbing film is formed so as to overlap a part of the reflecting film on the front side of the reflecting film. Here, the area corresponding to the projection light entering the surface of the plurality of the three-dimensional shape units corresponds to a partial area of each of the three-dimensional shape units.

In the screen described above, since the reflecting film is formed at least on the area corresponding to the projection light, it is possible to appropriately reflect the projection light, and since the light absorbing film is formed on the area corresponding to the outside light, it is possible to prevent reflection of the outside light, which is an unnecessary component. Thus, the contrast can further be improved, and it becomes possible to perform projection with stable image quality. On this occasion, since at least a part of the light absorbing film is particularly formed so as to overlap a part of the reflecting film on the front side of the reflecting film, the boundary between the reflecting film and the light absorbing film is defined by the outer edge of the light absorbing film, which can be formed by a simple application process. Therefore, there is no need for performing complicated control for forming the reflecting surface with respect to the screen, thereby adopting a structure, which can be formed with relative ease. Further, various kinds of materials can be used as the screen substrate without considering a light blocking property.

Further, according to a specific aspect of the invention, the reflecting film is formed on an entire surface of the plurality of the three-dimensional shape units of the screen substrate, and the light absorbing film is formed on the front side of the reflecting film and partially covers the reflecting film. In this case, it becomes possible to efficiently form the reflecting film with a uniform thickness with relative ease. Further, the part of the reflecting film on which the light absorbing film is not formed on the front side thereof becomes in the exposed state, and functions as the reflecting surface for reflecting the projection light.

Further, according to another aspect of the invention, the light absorbing film contains a black pigment absorbing at least light with visible wavelength. In this case, since the visible light component of the outside light is absorbed by the black pigment in the light absorbing film, it is possible to prevent the component from exerting influencer which is caused by the outside light obstructing a view reflected toward the side where the observer is located, on the projection image.

Further, according to another aspect of the invention, the reflecting film is a metal film, and a covering film formed between the metal film and the light absorbing film and adapted to cover the metal film is further provided. In this case, it becomes possible by the covering film to protect the metal film so as not to exfoliate or oxidize, or to enhance the reflecting operation of the metal film.

Further, according to another aspect of the invention, the covering film is one of a metal protecting film formed from a material protecting the metal film and a reflection enhancement film formed from a material enhancing a reflecting operation by the metal film. In this case, it becomes possible to protect the metal film so as not to exfoliate or oxidize if the metal protecting film is used as the covering film, or to enhance the reflecting operation of the metal film if the reflection enhancement film is used as the covering film.

Further, according to another aspect of the invention, the covering film is formed in an area identical to an area of the metal film. In this case, it is possible to form the covering film in the necessary area without waste.

Further, according to another aspect of the invention, the metal film is made of one of aluminum and silver. In this case, the reflecting film with a preferable reflecting property can be formed using various methods.

Further, according to another aspect of the invention, the reflecting film is a dielectric multilayer film. In this case, it is possible to provide sufficient strength to the reflecting film, and thus, it is possible to expose the part functioning as the reflecting surface without using, for example, the covering film.

Further, according to another aspect of the invention, there is further provided a foundation film for reinforcing adhesion formed between the reflecting film and the screen substrate. In this case, the adhesion strength of the reflecting film with respect to the screen substrate can be improved, thus the reflecting film can be formed at intended places, and the durability thereof can be enhanced.

According to another aspect of the invention, there is provided a method of manufacturing a screen having a screen substrate provided with a plurality of three-dimensional shape units disposed two-dimensionally on a front side of the screen substrate, comprising the steps of, forming a first film by inputting a first film forming material to form a reflecting film to at least an area corresponding to projection light entering a surface of the plurality of the three-dimensional shape units of the screen substrate, and forming a second film, by inputting a second film forming material to form a light absorbing film to the screen substrate at a predetermined incident angle, so as to overlap a part of the reflecting film on a front side of the reflecting film and to expose a remaining part of the reflecting film.

In the method of manufacturing a screen described above, the reflecting film is formed on the area corresponding to the projection light in the first film forming step, and the light absorbing film is formed in the second film forming step so as to overlap a part of the reflecting film on the front side of the reflecting film and to expose the remaining part of the reflecting film. In this case, in the method of manufacturing a screen, the boundary between the reflecting film and the light absorbing film is defined by the outer edge of the light absorbing film which can be formed using a simple application process or the like. Therefore, there is no need for performing complicated control for forming the reflecting surface. Further, the screen thus manufactured can appropriately reflect the projection light, prevent the reflection of the outside light, have a further improved contrast, and perform projection with stable image quality, while having a structure, which can be formed with relative ease. Further, various kinds of materials can be used as the screen substrate in manufacturing the screen.

Further, according to a specific aspect of the invention, in the second film forming step, the second film forming material is input from an incident direction different from an incident direction of the projection light, and is applied to the screen substrate, thereby forming the light absorbing film on an area corresponding to outside light entering a surface of the plurality of the three-dimensional shape units. Thus, it is possible to form the light absorbing film in the appropriate area corresponding to the outside light, and define the area of the reflecting surface and the area of performing the light absorption, while preventing the light absorbing film formed from the second film forming material from hindering the reflection of the projection light.

Further, according to another aspect of the invention, in the second film forming step, the second film forming material is applied from a direction opposite to the incident direction of the projection light. Here, in order for defining the direction opposite to the incident direction of the projection light, it is firstly assumed that an ideal plane obtained by grasping the surface of the screen as a plane in broad perspective is called a screen plane. Further, it is assumed that a plane, which is perpendicular to the screen plane, perpendicular also to a line segment obtained by orthographically projecting, on the screen plane, the light path of the projection light entering the screen plane from a certain direction, and includes the incident point of the projection light on the screen plane, is called a boundary plane. On this occasion, the direction opposite to the incident direction of the projection light denotes a direction from the side of the area not including the projection light out of two areas separated by the boundary plane toward the boundary plane, and including a component of the direction opposite to the component obtained by orthographically projecting the projection light to the screen plane. In general, in the image projection by the projector or the like in a room, the outside light enters from above the screen due to an illumination mounted on the ceiling of the room. In contrast, it is arranged that the projection light enters from below the screen by, for example, installing the projector or the like on the floor side of the room. In such a case, since the second film forming material is applied from the direction opposite to the incident direction of the projection light, namely from the above, the screen becomes to efficiently reflect the projection light entering from below, and at the same time efficiently absorbing the outside light entering from above, namely from the direction opposite to the direction of the projection light.

Further, according to another aspect of the invention, in the first film forming step, the reflecting film is formed on an entire surface of the plurality of the three-dimensional shape units of the screen substrate, and in the second film forming step, the light absorbing film is formed on a surface of the reflecting film. In this case, it becomes possible to form the reflecting film with a uniform thickness with relative ease. Further, the part of the reflecting film on which the light absorbing film is not formed on the front side thereof becomes in the exposed state, and such an exposed part functions as the reflecting surface for reflecting the projection light.

Further, according to another aspect of the invention, in the second film forming step, the second film forming material containing a black pigment absorbing at least light with a visible wavelength is applied. In this case, the light absorbing film formed from the second film forming material absorbs the visible light component in the outside light due to the black pigment, and is capable of preventing the component from being reflected toward the side where the observer is located thereby affecting the projection image. Further, since the film formation is performed using a application process, the light absorbing film can be formed with relative ease.

Further, according to another aspect of the invention, the reflecting film is a metal film, and after forming the metal film in the first film forming step and prior to forming the light absorbing film in the second film forming step, there is further provided the step of forming a covering film by inputting a third film forming material to form the covering film adapted to cover the metal film.

Further, according to another aspect of the invention, prior to forming the reflecting film in the first film forming step, there is further provided the step of forming a foundation film by inputting a fourth film forming material to form the foundation film in at least an area on the screen substrate, the area corresponding to the reflecting film. In this case, the adhesion strength of the reflecting film to the screen substrate can be improved by the foundation film, thus the reflecting film can be formed at intended places, and the durability thereof can be enhanced.

Further, according to another aspect of the invention, in the first film forming step, a method of forming a film with the first film forming material is one of a vacuum evaporation method, an ion assisted method, and a sputtering method. In this case, it is possible to form the reflecting film having a preferable reflecting property with efficiency in a desired condition.

BRIEF DESCRIPTION OF THE DRAWINGS

The invention will now be described with reference to the accompanying drawings, wherein like numbers reference like elements.

FIGS. 14A through 14D are side cross-sectional views for explaining a manufacturing process of a surface section of the screen.

DESCRIPTION OF EXEMPLARY EMBODIMENTS

First Embodiment

Figure 1:
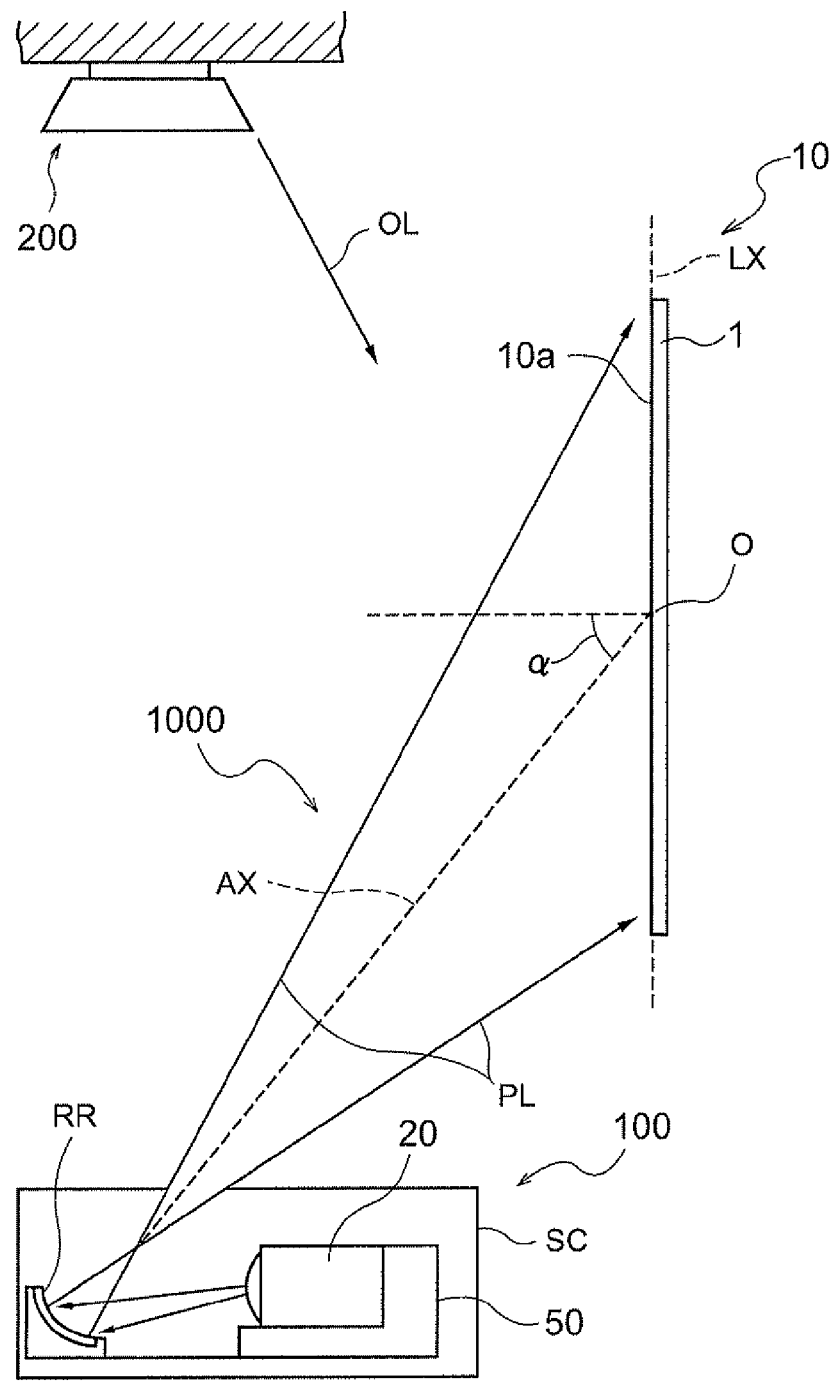
FIG. 1 is a diagram showing a projection system using a screen according to a first embodiment.
Figure 2:
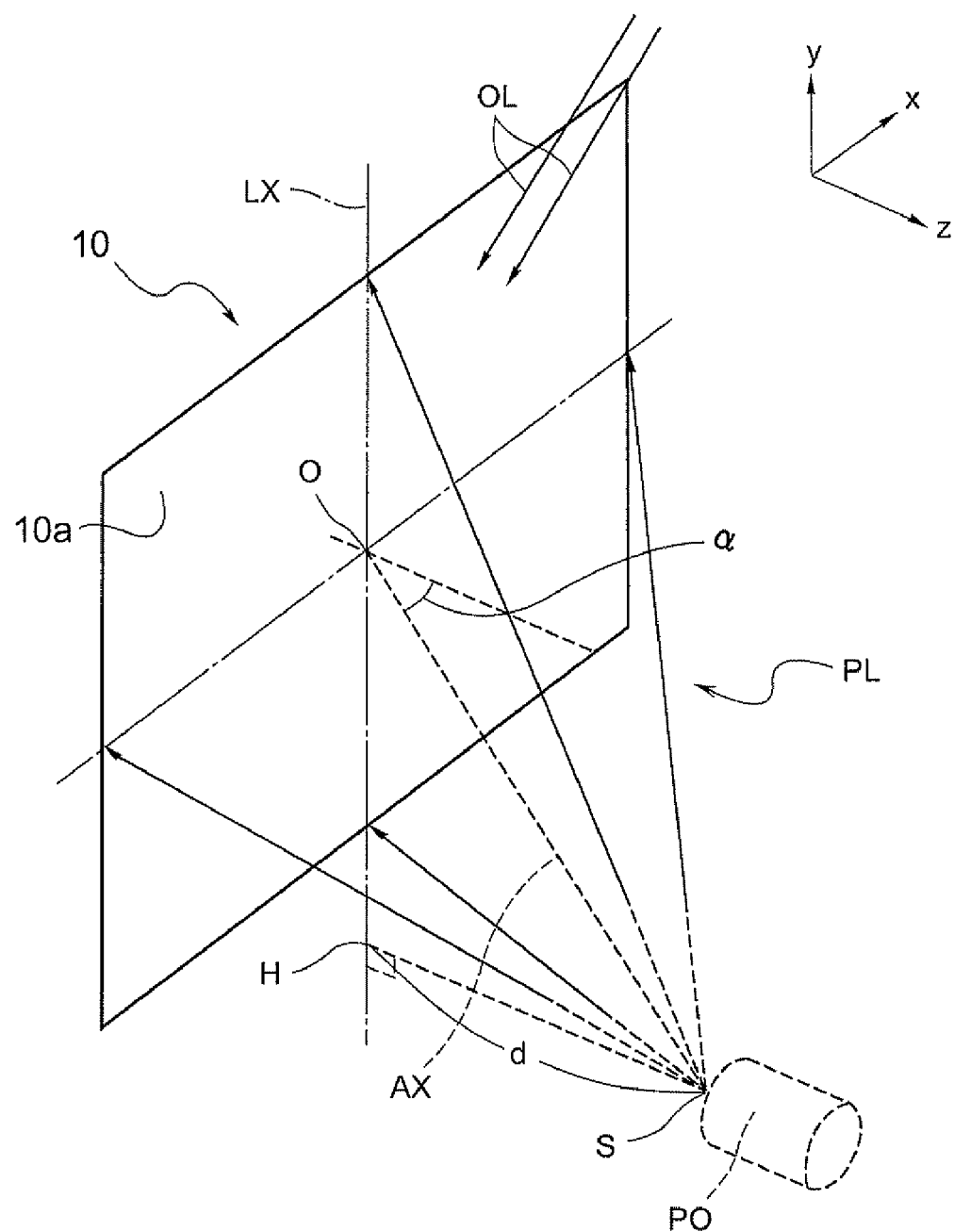
FIG. 2 is a schematic diagram for explaining a use condition of the entire screen.

A screen according to a first embodiment of the invention will hereinafter be explained with reference to the accompanying drawings. FIG. 1 is a diagram showing an example of a projection system using a screen according to the present embodiment. Further, FIG. 2 is a schematic diagram for explaining a use condition of the entire screen of the present embodiment.

As shown in FIG. 1, the projection system 1000 is provided with a reflective screen 10 and a projector 100 as an image projection apparatus. The screen 10 is provided with a screen substrate 1 formed from resin, and has a landscape-oriented rectangular shape installed with the long side thereof in a horizontal direction, namely the x direction, and the short side thereof in a vertical direction, namely the y direction, as shown in FIG. 2. It should be noted that on the surface formed by processing the front face 10a of the screen 10, namely the front side of the screen substrate 1, there is formed a microscopic structure, not shown, described later in detail. Further, as shown in FIG. 1, the projector 100 disposed in front of and below the screen 10 is provided with a projector main body 50, a projection lens main body 20, and a reflecting mirror RR. Each of mechanisms constituting the projector 100 is housed in the housing SC.

Hereinafter, image projection on the screen 10 by the projector 100 will be explained. Firstly, in accordance with the control in the projector main body 50, image light is formed, and is emitted from the projection lens main body 20. Further, the image light is reflected by the reflecting mirror RR, and is emitted toward the screen 10 as projection light PL from the projector 100. On this occasion, the projector 100 projects the projection light PL from below the screen 10 at an incident angle α to the center position O of the screen 10. The projection light PL projected to the entire screen 10 is reflected frontward by the reflecting surfaces on the microscopic relief structure, not shown, formed on the front face 10a of the screen 10, and becomes observable as an image having a rectangular shape bilaterally symmetric to a vertical axis LX passing through the center position O. It should be noted here that in the installation environment of the screen 10 and the projector 100, illumination by the outside light OL from above is provided by an illumination device 200 suspended from the ceiling in a room. As described above, in the projection in a room, the outside light OL from above mainly by an illumination exists as unnecessary light for the projection image on the screen 10, and in order for avoiding an influence of the outside light OL, it is arranged to project the projection light PL from below, which is the opposite side to the outside light OL.

Hereinafter, the positional relationship between the projection light PL projected from the projector 100 shown in FIG. 1 and the screen 10 will be explained with reference to FIG. 2. The projection lens PO shown in FIG. 2 corresponds to the projection lens main body 20 and the reflecting mirror RR shown in FIG. 1, and the projection light PL from a projection light source point S shown in FIG. 2 is arranged to enter the screen 10 at the same projection angle as in the case of the projection light PL shown in FIG. 1. In more specific explanations, the projection light source point S is disposed at a lower position relatively close to the screen 10 so that the light beam axis AX of the projection light PL entering the center position O of the screen 10 has the incident angle α. Further, here, the distance (i.e., the distance from the projection light source point S to an intersection H at which a line drawn from the projection light source point S perpendicularly to a plane including the front face 10a of the screen 10 intersects with the plane) from the projection light source point S to the screen 10 corresponds to a projection distance d.

In the case of a so-called front projection type such as the screen 10 shown in the drawing, it is desirable that the optical design of the microscopic relief structure on the front face 10a is made in accordance with the incident angle of the projection light PL at each position determined by the incident angle α and the projection distance d based on the center position O. Further, it is desirable to design the screen 10 so as not to reflect the outside light OL from above on the front face 10a toward the observer. In the present embodiment, taking the above into consideration, it is designed so that a treatment for reflecting the projection light PL and a treatment for absorbing the outside light OL are executed in addition to providing the microscopic relief structure with a predetermined pattern and a predetermined shape on the surface of the front face 10a.

Figure 3:
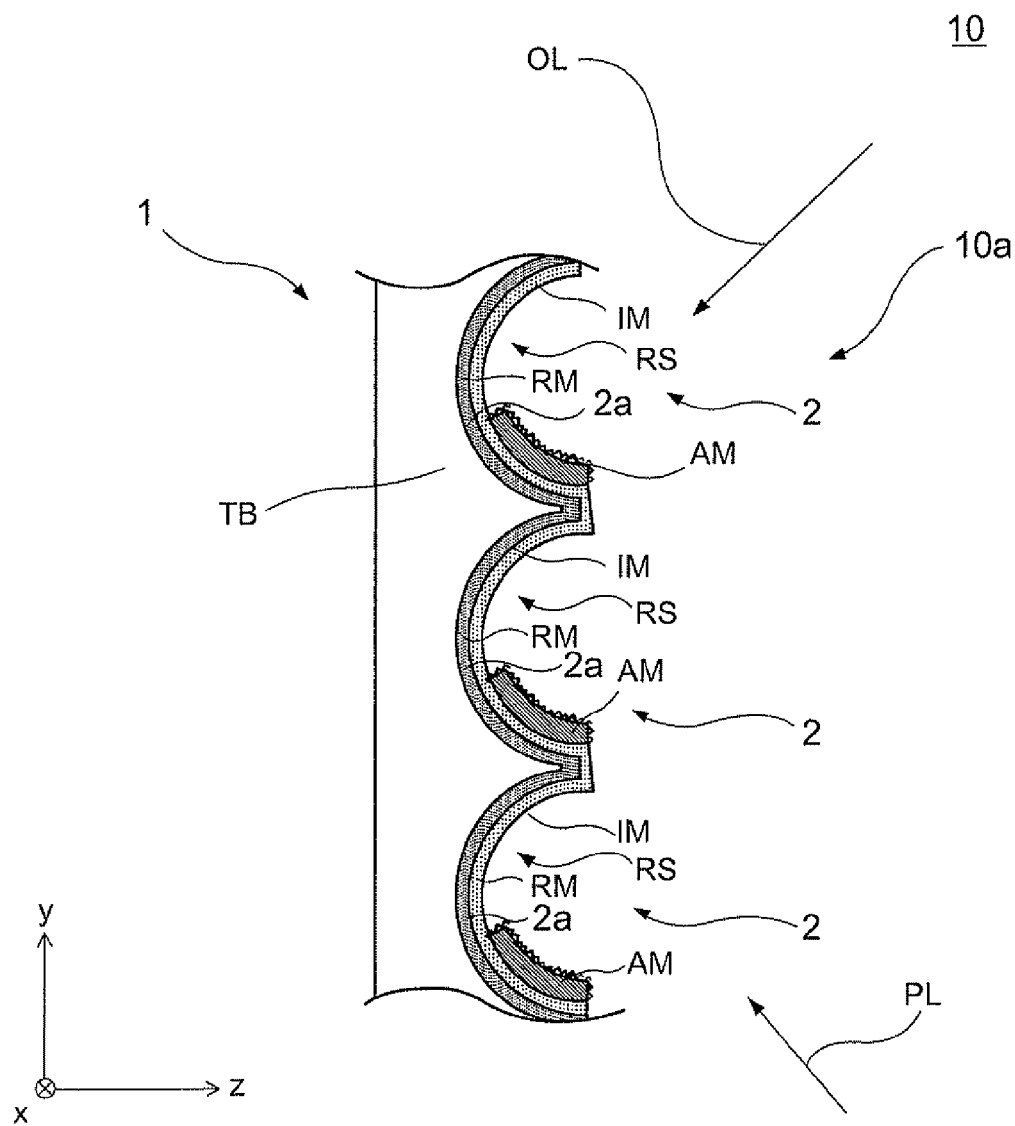
FIG. 3 is a side cross-sectional view for explaining a structure of the screen.

Hereinafter, an overall structure of the screen 10 will be explained around the surface structure provided to the front face 10a of the screen 10 with reference to FIG. 3. FIG. 3 is an enlarged side cross-sectional view of a part of the screen 10. The screen substrate 1 forming a base has a resin substrate TB as a main body section formed from a material such as polyethylene terephthalate (PET), and a number of three-dimensional shape units 2a forming a relief surface are provided on the front side of the resin substrate TB. A number of the three-dimensional shape units 2a respectively have spherical concave surfaces, and are formed on the front side of the screen substrate 1 two-dimensionally with no space therebetween. Each surface of a number of the three-dimensional shape units 2a is provided with a reflecting film RM. Further, on the reflecting film RM, there is formed a covering film IM for covering the reflecting film RM. It should be noted that the covering film IM is formed in the same area as the reflecting film RM, and covers the reflecting film RM in just proportion. Further, among the area occupied by the reflecting film RM and the covering film IM formed on each of the three-dimensional shape units 2a in the manner as described above, on an lower area of each of the three-dimensional shape units 2a, namely on an area on −y direction side of each of the three-dimensional shape units 2a, there is formed a light absorbing film AM for absorbing the outside light OL from above. In other words, the light absorbing film AM is formed so as to partially cover the reflecting film RM on the front side of the reflecting film RM and the covering film IM. As described above, the microscopic relief structure provided to the front face 10a of the screen 10 has a structure in which a triple-layer composed of the reflecting film RM, the covering film IM, and the light absorbing film AM is provided to each of a number of three-dimensional shape units 2a formed by the screen substrate 1 on the front side thereof. Here, an area of the reflecting film RM on which no light absorbing film AM is formed becomes in the state of exposing a double-layer structure section composed of the reflecting film RM and the covering film IM, and functions as a reflecting surface RS for the projection light PL.

As described later in detail, the reflecting film RM is a metal film formed by, for example, evaporating aluminum. The covering film IM is formed by, for example, evaporating silicon dioxide ($SiO_2$), and functions as a metal protective film for preventing the reflecting film RM from peeling or oxidizing.

The light absorbing film AM is formed by coating a coating material containing a black pigment for absorbing at least light with visible wavelengths and using cellulose nitrate or acrylic as synthetic resin, and an organic solvent as film forming components, and prevents at least visible light area component of the outside light OL unnecessary for image projection from being reflected toward the observer.

As described above, a number of three-dimensional shape units 2a, the reflecting film RM and the covering film IM formed on each of the three-dimensional shape units 2a, and the light absorbing film AM formed on a part of the reflecting film RM and the covering film IM in each of the three-dimensional shape units 2a form a number of surface sections 2 on the front face 10a. It is arranged that the light absorbing film AM of each of a number of the surface sections 2 prevents the reflection of the outside light OL entering an area other than the reflecting film RM in an appropriate manner. Further, as described later, it is arranged that the reflecting surface RS composed of the reflecting film RM and the covering film IM is formed at a position where the projection light PL is appropriately reflected and the outside light OL is reflected as little as possible. It should be noted that since a number of the three-dimensional shape units 2a are formed with no space therebetween as described above, at least an effective area of the front face 10a in which the image projection is performed is in the condition of being completely filled with a number of surface sections 2 with no flat area left. In this case, since no flat area is left, the phenomenon called hotspot in which the light is reflected specularly and enters observer's eyes can be avoided.

Hereinafter, the position where the reflecting surface RS is exposed on each of the three-dimensional shape units 2a will be explained. As described above, the projection light PL from the projector or the like is emitted from the projection light source point S (see FIG. 2) located below the screen 10, and enters the screen 10 while spreading conically. In accordance wherewith, the reflecting surface RS is disposed so as to be partially exposed in the upper area, namely the area on the +y direction side, of the concave surface formed with each of the three-dimensional shape units 2a using the light absorbing film AM as a mask. In other words, the reflecting surface RS is formed so as to be exposed facing the projection light PL from below, and is arranged to reflect the projection light PL toward the front side where the observer is located in an appropriately diffused state. On the other hand, it is arranged that the reflecting surface RS is exposed in the area where the outside light OL from above enters as rarely as possible due to the light absorbing film AM. In other words, it is arranged that by covering a part of the reflecting film RM with the light absorbing film AM so as to prevent the part from functioning as the reflecting surface RS, the outside light OL is prevented from being reflected toward the front side where the observer is located. As described above, it becomes possible that the reflecting surface RS appropriately emits the projection light PL toward the front side in the front side 10a, and the light absorbing film AM efficiently prevents the reflection of the outside light OL.

Hereinafter, a method of manufacturing the screen 10 will be explained. Firstly, manufacturing of the screen substrate 1 of the screen 10 will briefly be explained. The screen substrate 1 is formed using a sheet like member made of, for example, polyethylene terephthalate (PET) as a principal material. Specifically, after coating a surface of the sheet like member with UV cured resin, for example, or after heating the surface of the sheet like member to be softened, press embossing is executed thereon with a glass die or the like having the relief shape corresponding to a number of three-dimensional shape units 2a. Thus, the screen substrate 1 is manufactured.

Figure 4C:
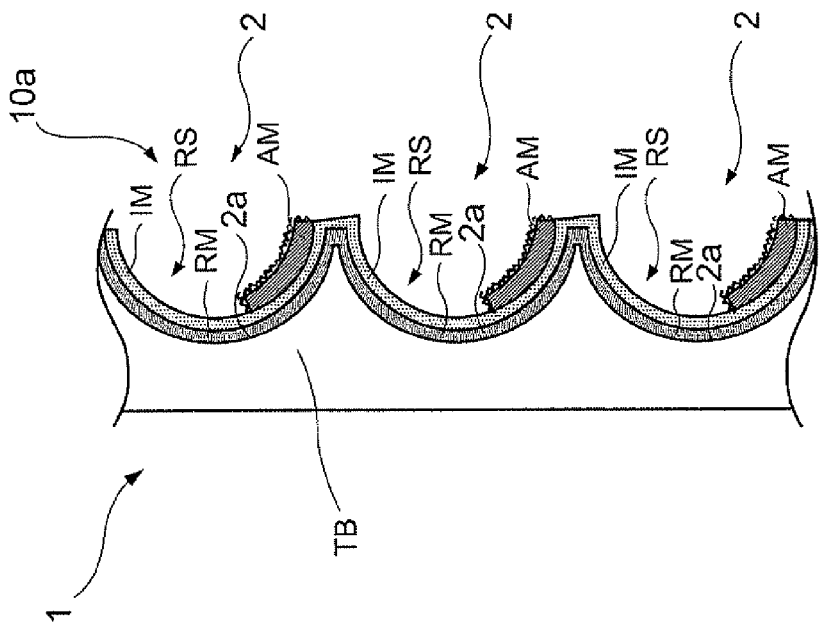
FIGS. 4A through 4C are side cross-sectional views for explaining a manufacturing process of a surface section of the screen.
Figure 4B:
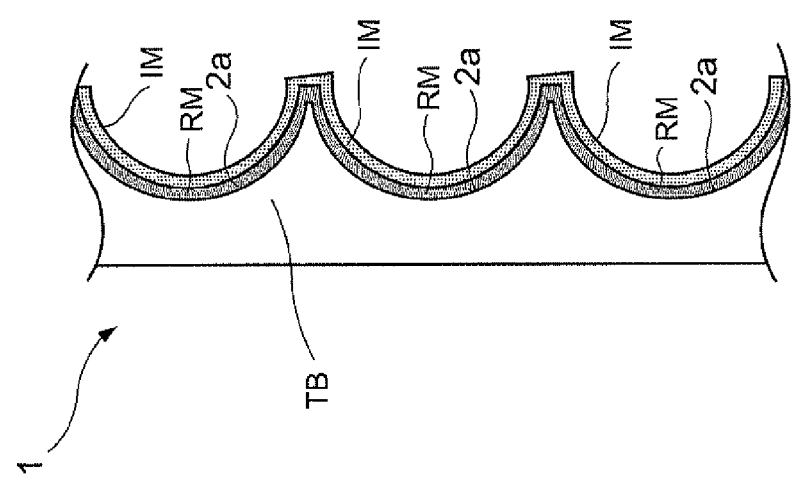
Figure 4A:
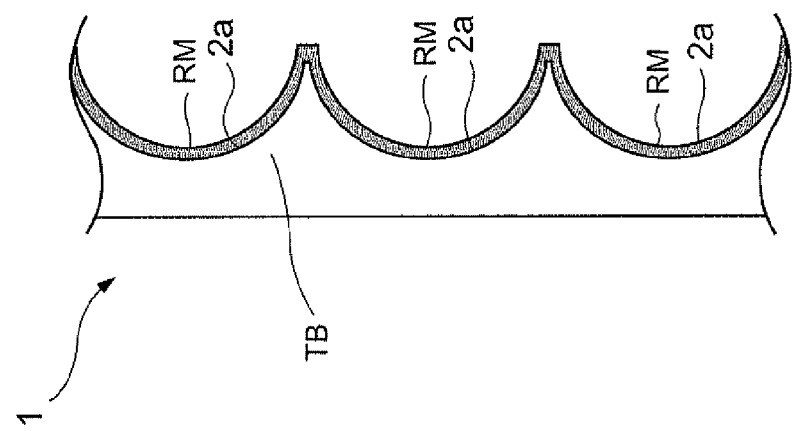

Then, a manufacturing process of the surface sections 2 respectively formed on the three-dimensional shape units 2a will be explained. FIGS. 4A through 4C are side cross-sectional views for explaining the manufacturing process of a number of surface sections 2 of the screen 10. Firstly, as shown in FIG. 4A, the reflecting film RM is formed (a first film forming process) on the entire surfaces of all of the three-dimensional shape units 2a with a roughly constant film thickness, and subsequently, as shown in FIG. 4B, the covering film IM is formed (a covering film forming process) on the reflecting film RM. Further, as shown in FIG. 4C, the light absorbing film AM is formed (a second film forming process) in some areas on each of the three-dimensional shape units 2a. A number of surface sections 2 are formed through the first film forming process, the covering film forming process, and the second film forming process, thereby manufacturing the screen 10.

Figure 5A:
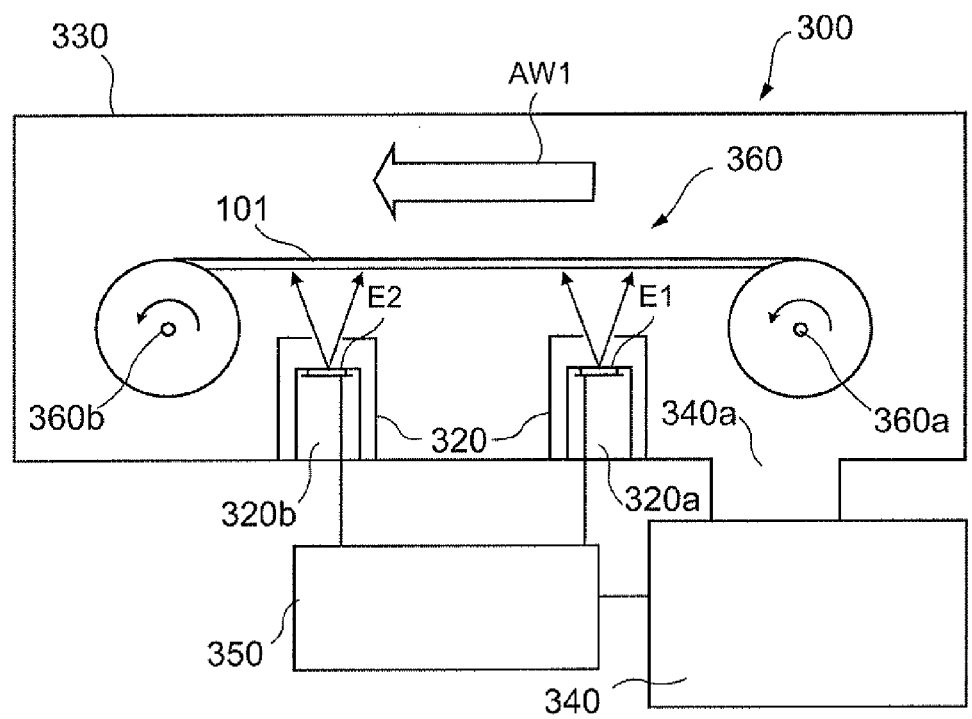
FIGS. 5A and 5B are side cross-sectional diagrams for explaining an example of manufacturing apparatuses for forming a reflecting film and a covering film, respectively.

Hereinafter, among the first film forming process, the covering film forming process, and the second film forming process, the first film forming process and the covering film forming process will be explained firstly. FIG. 5A is a side cross-sectional view for explaining an example of a first manufacturing apparatus for forming the reflecting film RM and the covering film IM in a lump as the first film forming process and the covering film forming process. The first manufacturing apparatus 300 shown in FIG. 5A is a vacuum evaporation device for forming a film by vacuum evaporation while evaporating the film forming material using, for example, resistive heating. The first manufacturing apparatus 300 is provided with an evaporation source device 320 containing the source material, a chamber 330 as a vacuum container, a vacuum pump 340, which is an exhaust system for creating a vacuum condition inside the chamber 330, and is formed of, for example, a rotary pump, and a control device 350 for performing overall control of the sections, thereby controlling the entire apparatus. Further, the first manufacturing apparatus 300 is provided with a moving device 360 for feeding a belt like screen substrate 101. The moving device 360 is provided with a delivery mechanism 360a for delivering the belt like screen substrate 101, and a winding mechanism 360b for winding the screen substrate 101. It should be noted that a motor and so on to be attached to each of the mechanisms 360a, 360b are omitted from the drawing. The evaporation source device 320 is provided with a first ejection device 320a for ejecting aluminum as a first film forming material E1 for forming the reflecting film RM shown in FIG. 3, and a second ejection device 320b for ejecting silicon dioxide ($SiO_2$) as a third film forming material E2 for forming the covering film IM. The first and the second ejection devices 320a, 320b respectively mount the first and the third film forming materials E1, E2 on the boats, and heat to evaporate the respective film forming materials E1, E2 by the resistive heating using electrical power supplied from the control device 350, thereby performing the film formation. It should be noted that the belt like screen substrate 101 corresponds to a plurality of (e.g., 100 pieces of) screen substrate 1. In other words, what is obtained by cutting the screen substrate 101 into pieces with a predetermined size corresponds to a sheet of screen substrate 1.

As shown in FIG. 5A, in the moving device 360, the belt like screen substrate 101 is in the state of having the both ends respectively wound around the mechanisms 360a, 360b like a cassette tape. It is arranged that in accordance with the mechanisms 360a, 360b rotating in one direction in sync with each other, the moving device 360 moves the screen substrate 101 in a direction of the arrow AW1 at a constant speed. Further, the ejection devices 320a, 320b are disposed below the screen substrate 101 fed by the moving device 360 and opposed to the front side of the screen substrate 101, and arranged to input the first film forming material E1 and the third film forming material E2 approximately perpendicularly to the screen substrate 101, respectively. Further, each of the ejection devices 320a, 320b is disposed to form a line extended from the front side of the sheet of FIG. 5A to the back side thereof so that the film can be formed uniformly throughout the entire surface of the screen substrate 101.

Hereinafter, an operation of the first manufacturing apparatus 300 will be explained. Firstly, the air is exhausted from an exhaust port 340a of the vacuum pump 340 to make a vacuum state with pressure no higher than a predetermined value (e.g., no higher than $10^{-3}$Pa) inside the chamber 330. Then, the mechanisms 360a, 360b are driven to feed the screen substrate 101, thereby exposing a process object part of the screen substrate 101 for forming the reflecting film RM and the covering film IM. When the process object part of the screen substrate 101 is fed from the delivery mechanism 360a to be exposed in the chamber 330, the first film forming material E1 ejected perpendicularly from the first ejection device 320a is first input to the process object part of the screen substrate 101. Thus, the reflecting film RM is provided to the process object part of the screen substrate 101. Subsequently, the third film forming material E2 ejected perpendicularly from the second ejection device 320b is input to the process object part of the screen substrate 101. Thus, the covering film IM is provided to the process object part of the screen substrate 101. The process object part of the screen substrate 101 thus provided with the reflecting film RM and the covering film IM is wound by the winding mechanism 360b.

In the manner as described above, the first manufacturing apparatus 300 uniformly forms the reflecting film RM having a reflecting property and a uniform film thickness and the covering film IM on the screen substrate 101. It should be noted that in the first manufacturing apparatus 300, once the vacuum state is made, the screen substrate 101 can be moved without breaking the vacuum state, and therefore it is possible to form the reflecting film RM and the covering film IM on a plurality of screen substrates 1 in a lump.

Figure 5B:
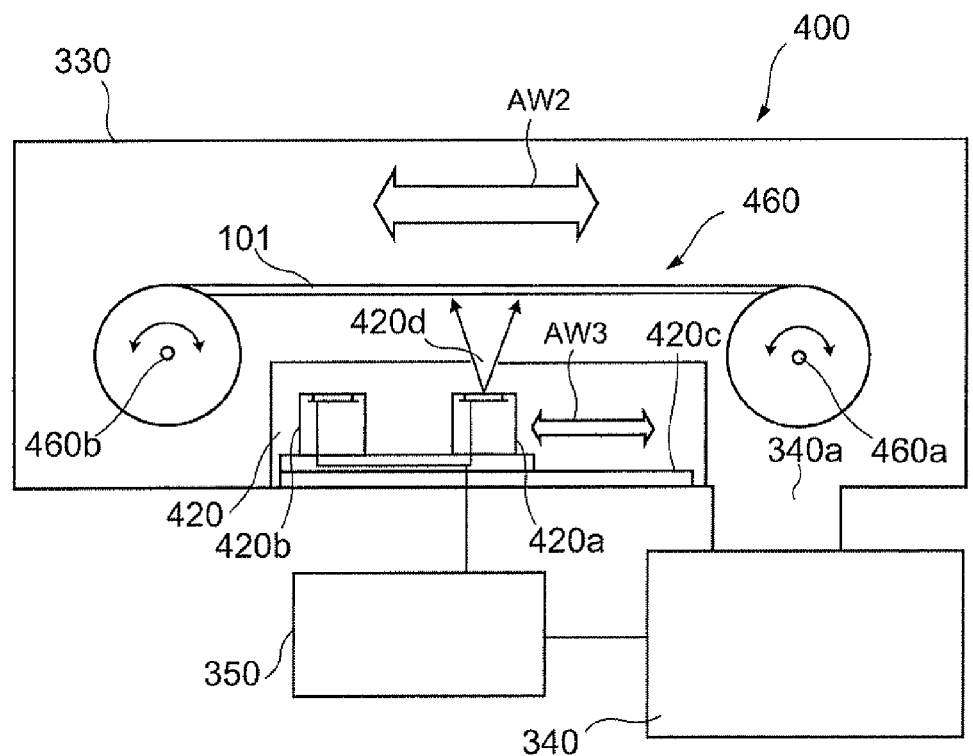

Further, the films can also be formed in substantially the same manner as described above by a first manufacturing apparatus 400 shown in FIG. 5B. The first manufacturing apparatus 400 is a modified example of the first manufacturing apparatus 300. In the first manufacturing apparatus 400, it becomes possible that mechanisms 460a, 460b constituting a moving device 460 rotate in both directions in sync with each other, thereby moving the screen substrate 101 reciprocally in directions indicated by the arrow AW2 at a constant speed. Further, ejection devices 420a, 420b of an evaporation source device 420 are arranged to be slidable on a pedestal 420c in directions of the arrow AW3. According to the configuration described above, the first manufacturing apparatus 400 can first form the reflecting film RM by disposing the first ejection device 420a so as to be opposed to an ejection opening 420d when moving the screen substrate 101 toward the left side of the sheet of the drawing. Further, when moving the screen substrate 101 toward the right side of the sheet, the covering film IM can be formed by sliding the ejection devices 420a, 420b inside the evaporation source device 420 to position the second ejection device 420b so as to be opposed to the ejection opening 420d.

Figure 6A:
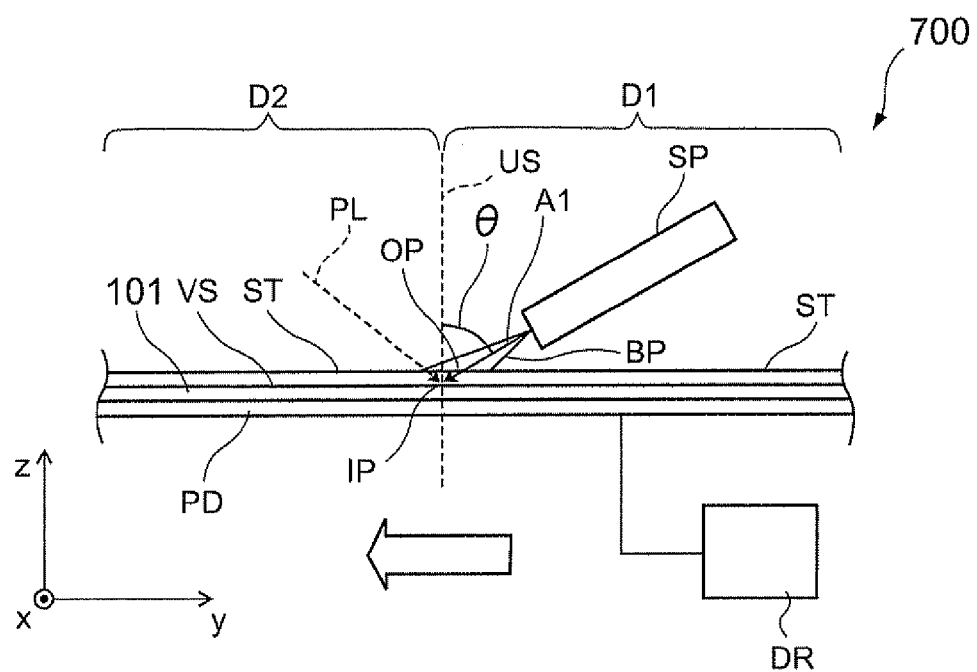
FIGS. 6A and 6B are schematic diagrams for explaining an example of a manufacturing apparatus for forming a light absorption film, respectively.

Then, a second film forming process will hereinafter be explained. FIG. 6A is a schematic diagram for explaining an example of a second manufacturing apparatus for performing formation of the light absorbing film AM as the second film forming process. The second manufacturing apparatus 700 shown in FIG. 6A is a film forming apparatus for forming the light absorbing film AM by applying black paint BP as a second film forming material from an oblique direction, and is provided with a pedestal PD for supporting the screen substrate 101 having been processed in the first film forming process, a driving device DR for moving the pedestal PD in various directions, a spray SP as a ejection device for ejecting the black paint BP, and a shielding plate ST for accurately controlling the ejection direction of the black paint BP. It should be noted that unlike the first manufacturing apparatus 300, the second manufacturing apparatus 700 is a relatively simple apparatus operating in an atmospheric pressure without using vacuum evaporation.

The screen substrate 101 is supported by the pedestal PD as a supporting stage, and is capable of moving with the pedestal PD by the driving device DR in various directions on the same plane (the plane parallel to the x-y plane) along a direction of the arrow shown in the drawing and so on. The spray SP ejects the black paint BP as the second film forming material to form the light absorbing film AM on the screen substrate 101 supported by the pedestal PD. The incident angle θ of the black paint BP from the spray SP to the screen substrate 101 is determined on the assumption of a principal incident angle of the outside light OL not shown, for example. Therefore, it is arranged that the black paint BP enters the screen substrate 101 from an oblique direction corresponding to the outside light OL, and is applied to the screen substrate 101. On the other hand, as shown in FIG. 3 and so on, the front face 10a of the screen 10 is provided with a relief surface with a number of three-dimensional shape units 2a. Therefore, the light absorbing film AM using the black paint BP as the film forming material is formed so as to overlap a part of the reflecting film RM and the covering film IM on the front side thereof, and the remaining part thereof on which no light absorbing film AM is formed on the front side thereof becomes in the exposed state, thereby forming the reflecting surface RS in the necessary area in the exposed state. It should be noted that the shielding plate ST is formed so as to cover the screen substrate 101, and is provided with an opening OP in the vicinity of the spray SP.

Hereinafter, an operation of the second manufacturing apparatus 700 shown in FIG. 6A will be explained in detail. Firstly, the black paint BP is sprayed from the spray SP with the incident angle θ to the screen substrate 101 supported by the pedestal PD. On this occasion, some of the black paint BP is blocked by the shielding plate ST. In other words, among the black paint BP, only a part thereof passing through the opening OP of the shielding plate ST is applied on the screen substrate 101. Since the limitation of the shielding plate ST eliminates a component of the black paint BP sprayed from the spray SP so as to spread therefrom, the component of the black paint BP proceeding toward the surface of the screen substrate 101 becomes in the state of having an incident angle and an incident direction with substantially uniform directional characteristics. Thus, the boundary between the area where the light absorbing film is formed on the screen substrate 101 and the area where no light absorbing film is formed can be made relatively clear. As described above, in the area where no film of the black paint BP is made, the reflecting film RM and the covering film IM are exposed as shown in FIG. 3 and so on to form the reflecting surface RS. Further, the screen substrate 101 moves two-dimensionally with the pedestal PD in association with the application of the black paint BP by the spray SP. In other words, the spray SP can be moved two-dimensionally so that the entire surface of the screen substrate 101 can relatively be scanned with the spray SP and the shielding plate ST. As a result, the light absorbing film AM as shown, for example, in FIG. 3 can be formed with respect to the entire screen substrate 101. As described above, by spraying the black paint BP on the relief surface with a number of three-dimensional shape units 2a shown, for example, in FIG. 3 from the oblique direction, the light absorbing film AM is formed partially on the area of each of the three-dimensional shape units 2a, and thus, the reflecting area the projection light PL with the reflecting film RM and the covering film IM and the light absorbing area for the outside light OL with the light absorbing film AM are defined. It should be noted that a sheet of screen 10 can be cut out therefrom by cutting the screen substrate 101 in the state of being provided with the light absorbing film AM so as to have a predetermined size.

In the process described above, the incident direction A1 of the black paint BP for forming the light absorbing film AM is set to be a direction opposite to the incident direction of an assumed projection light PL illustrated with the broken line. Hereinafter, a relationship between the incident direction A1 of the black paint BP and the incident direction of the projection light PL will specifically be explained. Firstly, an ideal plane, which is assumed as a plane by grasping the surface of the screen in broad perspective neglecting the microscopic relief structure thereof, is defined as a screen plane VS. This is the same assumption as in the case of the screen 10 shown in FIG. 2, for example, regarding the front face 10a as a plane. Further, a plane perpendicular to the screen plane VS and also perpendicular to a line segment obtained by orthographically projecting (i.e., projecting in the +y direction in FIG. 6A) the light path of the projection light PL on the screen plane VS is defined as a boundary plane US. In particular in FIG. 6A, the boundary plane US is arranged to include the incident point IP of the black paint BP on the screen plane VS. Here, the incident point IP denotes the point at which the black paint BP reaches the surface of the screen plane VS from the incident direction A1 as the principal direction, and it is assumed that the assumed projection light PL shown in the drawing also has the incident point IP as an incident point thereof. Taking the boundary plane US defined above as a base, the relationship between the incident direction of the projection light PL and the incident direction A1 of the black paint BP will be considered. In this case, the incident direction A1 of the black paint BP is arranged to include a component of the direction (−y direction in the sheet of FIG. 6A) from the side (i.e., +y direction side) of the area D1 not including the projection light PL out of the two areas D1, D2 separated by the boundary plane US toward the boundary plane US. In other words, the incident direction A1 has a component of a direction opposite to the direction component (+y direction) obtained by orthographically projecting the projection light PL to the screen plane VS among the direction components of the projection light PL. Therefore, as shown, for example, in FIG. 3, the light absorbing film AM thus formed is arranged to be able to efficiently absorb the outside light OL generally entering from the side opposite to the side from which the projection light PL enters. Further, the reflecting surface RS formed by remaining as the area in which no light absorbing film AM is formed is arranged to efficiently reflect the projection light PL entering from below.

Figure 6B:
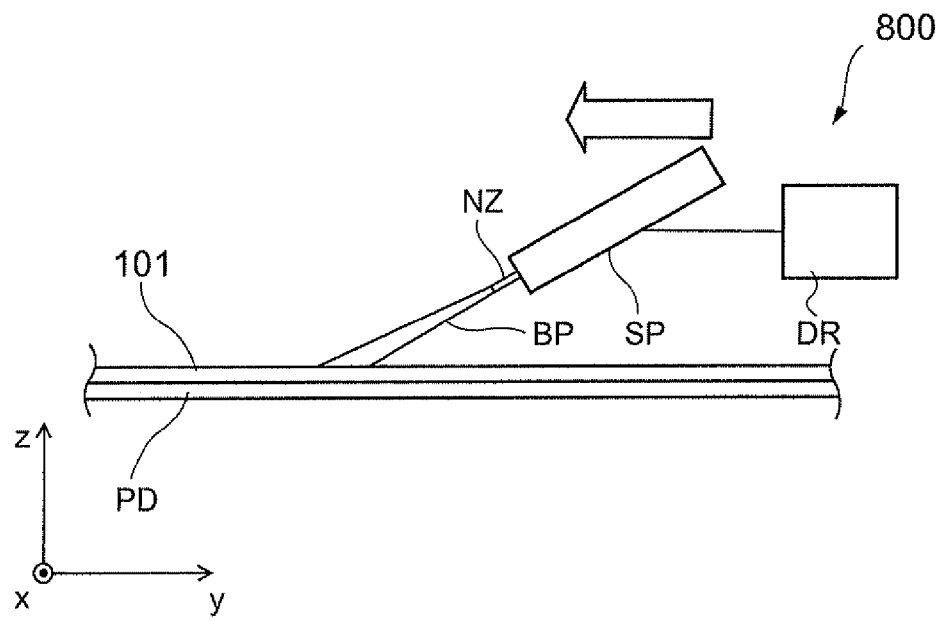

A second manufacturing apparatus 800 shown in FIG. 6B is a modified example of the second manufacturing apparatus 700 shown in FIG. 6A. The second manufacturing apparatus 800 is provided with a narrowing nozzle NZ for preventing spreading at a tip portion of the spray SP, and is arranged to spray the black paint BP from the tip of the nozzle NZ. Since the black paint BP can thus be made in the state of not spreading too widely when being sprayed from the spray SP, there is no need for providing the shielding plate unlike the second manufacturing apparatus 700. Further, on this occasion, by moving the spray SP two-dimensionally in parallel to the x-y plane including, for example, the direction indicated by the arrow in the drawing using the driving device DR to scan the entire surface of the screen substrate 101 with the spray SP, the light absorbing film AM shown, for example, in FIG. 3 can be formed in the same manner as the application process with the second manufacturing apparatus 700 shown in FIG. 6A.

As described above, since the reflecting film RM is firstly formed as a film in the first film forming process throughout the entire surfaces of all of a number of three-dimensional shape units 2a keeping the thickness of the film in a uniform state, the screen 10 according to the present embodiment can be manufactured with relative ease and becomes to have a high reflecting property.

Further, in the present embodiment, since the light absorbing film AM is formed taking the incident characteristic of the projection light PL and the incident characteristic of the outside light OL into consideration in the second film forming process, the screen 10 is also arranged to prevent the outside light OL from being reflected in the reflecting film RM. On this occasion, it is enough for the light absorbing film AM to be formed in the necessary area, and there is no need for equalizing the thickness of the light absorbing film AM. Therefore, in the operation of the second manufacturing apparatus 700, for example, precise thickness control for the film is not required in forming the light absorbing film AM. Further, since the light absorbing film AM is formed by applying the black paint BP, there is no need for forming the vacuum state. Therefore, the second film forming process can be performed with a simple apparatus. Since the light absorbing film AM is formed in the second film forming process while being appropriately defined, the screen 10 becomes to be able to appropriately reflect the projection light PL while preventing the reflection of the outside light OL, to have further improved contrast, and to perform projection with stable image quality.

Further, by forming the covering film IM in the covering film forming process, it becomes possible to prevent the reflecting film RM from exfoliating or oxidizing, thereby achieving the longer operating life.

It should be noted that a film forming process with other methods than the method described above can be used in forming the reflecting film RM and the covering film IM in the first film forming process and the covering film forming process, and those not having the reflecting film RM and so on the entire surface of each of a number of three-dimensional shape units 2a can also be adopted providing the reflecting film RM and the covering film IM are formed at least the area in which the reflecting surface RS is exposed. As such a method, it can be considered, for example, that in forming the reflecting film RM and so on, a film forming material is locally evaporated from an oblique direction so as to cover the area to be formed as the reflecting surface RS among the surface of the screen substrate 1. It should be noted that in the case of forming the reflecting film RM and so on using, for example, a dielectric multilayer film, precise control for keeping the thickness of the film constant is required. It should be noted that also in the case in which the reflecting film RM and so on are not formed throughout the entire surface of each of a number of three-dimensional shape units 2a and the base surface of the screen substrate 1 is partially exposed as described above, by forming a part of the light absorbing film AM in the second film forming process, for example, so as to cover the base surface of the screen substrate 1 and overlap the reflecting film RM and so on around the outer periphery of the reflecting film RM and so on, it becomes possible to prevent the base surface of the screen substrate 1 from being exposed, and to define the boundary between the area of the reflecting surface RS and the area of the light absorbing film AM.

Figure 7:
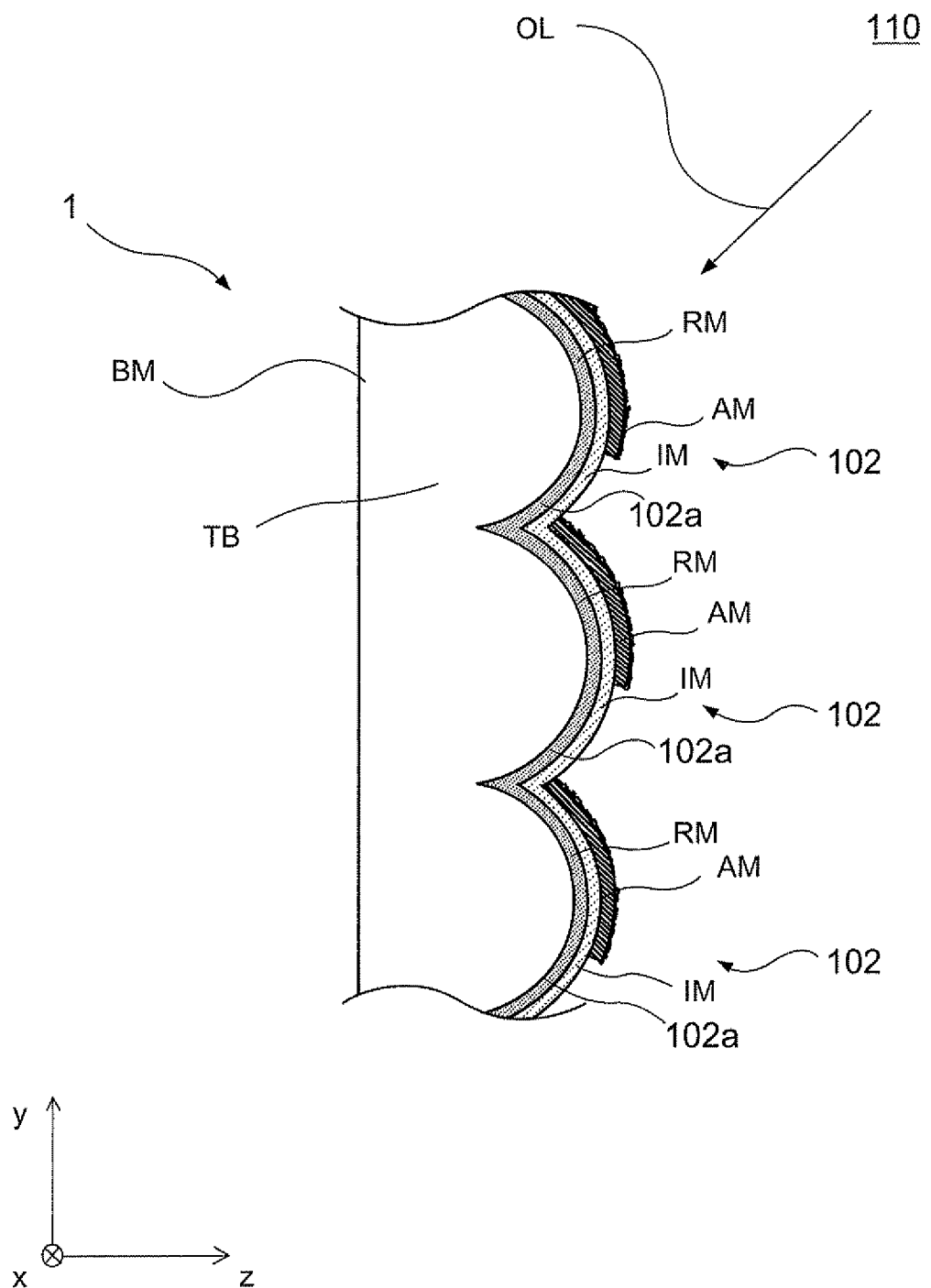
FIG. 7 is a side cross-sectional view for explaining a modified example of the screen.

FIG. 7 shows a modified example of the screen 10 shown, for example, in FIG. 3. In the screen 110 shown in FIG. 7, each surface section 102 is arranged to have a convex shape. It should be noted that in this case the light absorbing film AM is formed on a partial area on the upper side, namely +y direction side in each three-dimensional shape unit 102a.

Further, it is sufficient for the screen substrate 1 of the present embodiment to have enough strength as a screen sheet, various materials can be applied as the screen substrate 1, and a light absorbing member can also be used. As a material of the light absorbing member, black polyethylene terephthalate (PET), black polyvinyl chloride, and so on having a light absorbing function can be considered. Further, transparent PET or the like can also be used.

Further, although aluminum is used as the film forming material in the forming process of the reflecting film RM in the screen substrate 1 of the present embodiment, in the case of forming the reflecting film RM from a metal film, silver or the like can also be used besides aluminum.

Second Embodiment

Figure 8:
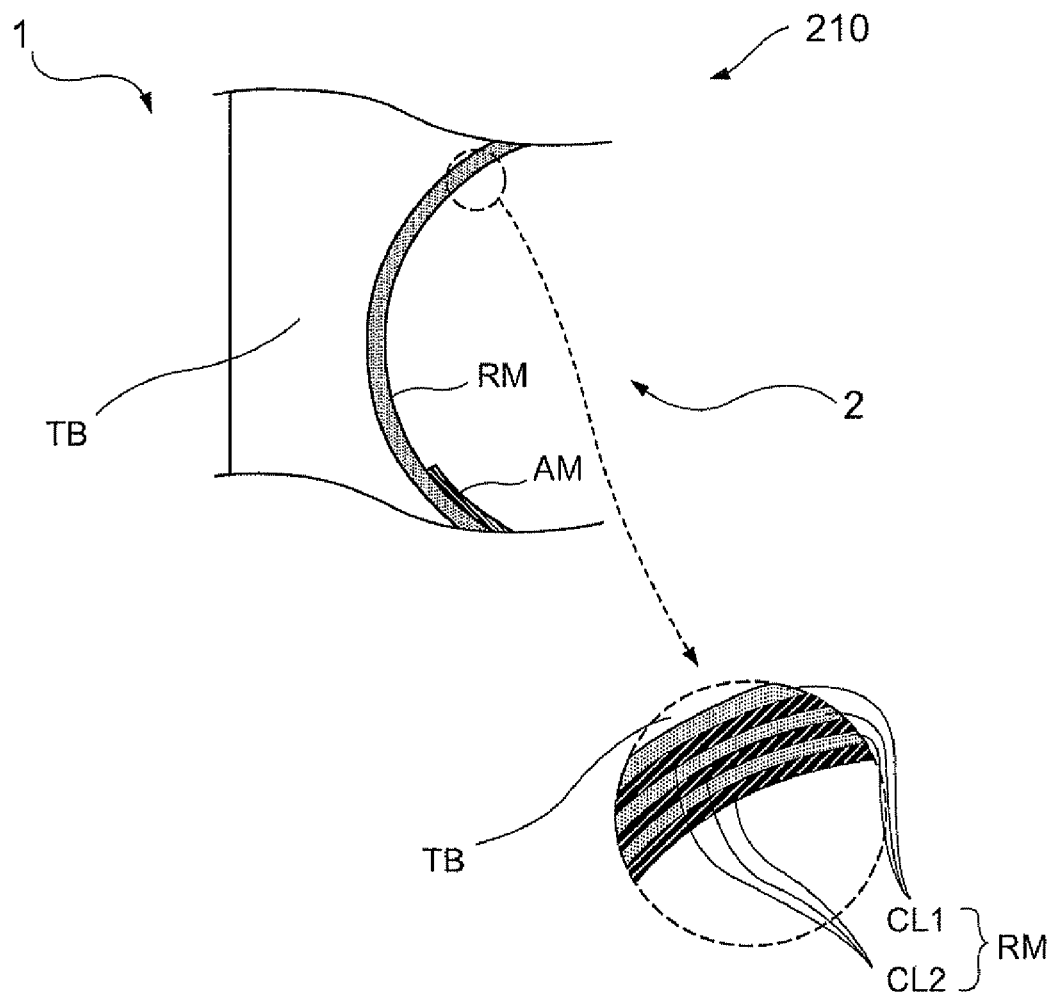
FIG. 8 is a side cross-sectional view for explaining a screen according to a second embodiment.

FIG. 8 is a side cross-sectional view for enlargedly showing a screen according to a second embodiment. The screen 210 according to the present embodiment is a modified example of the screen 10 and so on of the first embodiment, and is provided with the screen substrate 1, the reflecting film RM, and the light absorbing film AM. In particular, the reflecting film RM has a dielectric multilayer film structure having two types of dielectric layers CL1, CL2 with refractive indexes different from each other stacked alternately. The dielectric layers CL1, CL2 can be composed, for example, of $TiO_2$ (titanium oxide) and $SiO_2$, or $Ta_2O_5$ (tantalum pentoxide) and $SiO_2$. In this case, since it is possible to make the reflecting film RM itself strong enough, unlike the case with the screen 10 and so on shown in FIG. 3, it is possible to form the condition in which the most superficial layer of the dielectric multilayer film is exposed as a part of the surface of the screen 210 without providing the covering film on the reflecting film RM.

It should be noted that the dielectric multilayer film structure can be manufactured, for example, in the first manufacturing apparatus 400 shown in FIG. 5B by repeatedly ejecting the film forming materials for forming the dielectric layers CL1, CL2 alternately using the first and the second ejection devices 420a, 420b. Specifically, the film forming materials for forming the dielectric layers CL1, CL2 are mounted on the boats of the first and the second ejection devices 420a, 420b, respectively, and the film forming materials are heated to be evaporated, thereby forming the film. In further specific explanations, when firstly moving the screen substrate 101 toward the left side of the sheet of the drawing, by previously sliding the ejection devices 420a, 420b inside the evaporation source device 420 so that the first ejection device 420a is positioned to be opposed to the ejection opening 420d, the dielectric layer CL1 forming the reflecting film RM can be formed. Further, when moving the screen substrate 101 toward the right side of the sheet, the dielectric layer CL2 forming the reflecting film RM can be formed by previously sliding the ejection devices 420a, 420b inside the evaporation source device 420 to position the second ejection device 420b so as to be opposed to the ejection opening 420d. Subsequently, it is only required to repeat the film formation for forming the dielectric layers CL1, CL2 alternately using the first and the second ejection devices 420a, 420b of the evaporation source device 420.

Third Embodiment

Figure 9:
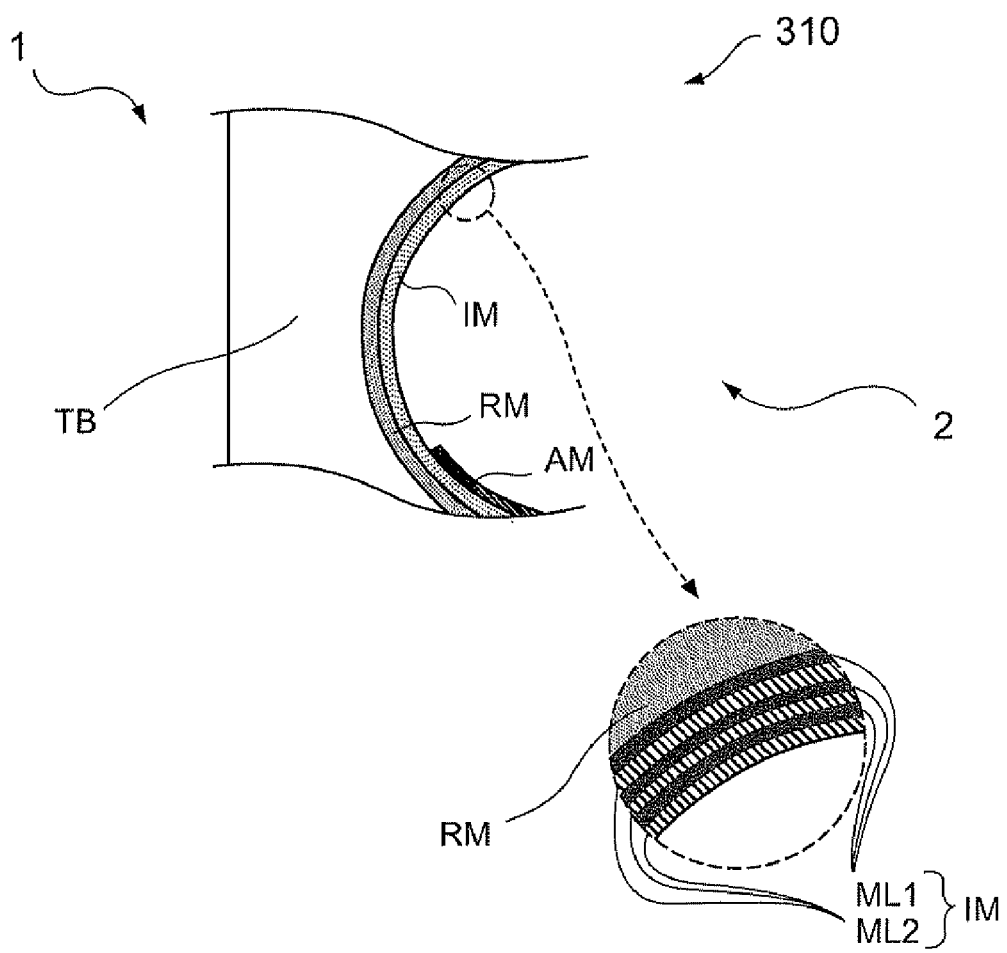
FIG. 9 is a side cross-sectional view for explaining a screen according to a third embodiment.

FIG. 9 is a diagram for explaining a screen according to a third embodiment. Since the screen according to the present embodiment is the same as that described as the first embodiment except the structure of the covering film, detailed explanations regarding the other structures will be omitted. In the screen 310 shown in FIG. 9, the covering film IM has a dielectric multilayer film structure having two types of dielectric layers ML1, ML2 with refractive indexes different from each other stacked alternately. In other words, by forming the dielectric layers ML1, ML2 using, for example, $TiO_2$ and $SiO_2$, or $Ta_2O_5$ and $SiO_2$ instead of the single layer film of $SiO_2$, the covering film IM of the present embodiment is arranged to function as a reflection enhancement film for enhancing the reflecting operation of the reflecting film RM.

Figure 10:
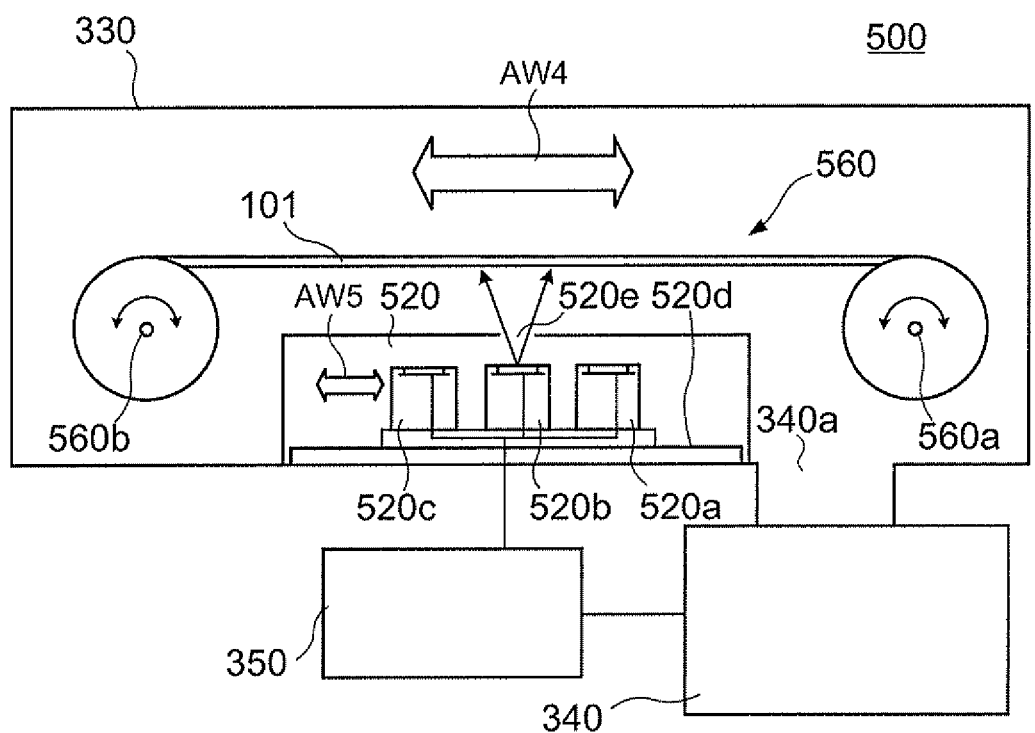
FIG. 10 is a side cross-sectional view of a manufacturing apparatus for forming a reflecting film and a covering film.

Hereinafter, a method of manufacturing the screen according to the present embodiment will be explained. FIG. 10 is a diagram for explaining an example of a first manufacturing apparatus for performing the first film forming process among the film forming processes for manufacturing the screen 310 shown in FIG. 9. The first manufacturing apparatus 500 according to the present embodiment is a modified example of the first manufacturing apparatus 400 shown in FIG. 5B. It should be noted that since the method of manufacturing a screen according to the present embodiment is the same as that described as the first embodiment except the first film forming process, illustrations and explanations of the film forming processes other than the first film forming process will be omitted.

The first manufacturing apparatus 500 shown in FIG. 10 is a vacuum evaporation apparatus for evaporating the film forming materials, for example, by resistive heating, thereby performing the film formation by the vacuum evaporation, and is provided with an evaporation source device 520, a chamber 330, a vacuum pump 340, a control device 350, and a moving device 560 for feeding the belt like screen substrate 101, similarly to the first manufacturing apparatus 400. The moving device 560 is provided with a delivering mechanism 560a for delivering the screen substrate 101 and a winding mechanism 560b for winding the screen substrate 101, and it is arranged that the screen substrate 101 can move reciprocally in the directions indicated by the arrow AW4 at a constant speed by the mechanisms 560a, 560b rotating in both directions in sync with each other. Further, among the constituents described above, the evaporation source device 520 is particularly provided with three ejection devices, namely first through third ejection devices 520a, 520b, 520c. These three ejection devices 520a, 520b, 520c are arranged to be able to move in a sliding manner on a pedestal 520d as indicated by the arrow AW5 in both directions. According to the configuration described above, the first manufacturing apparatus 500 can first form the reflecting film RM by previously disposing the first ejection device 520a so as to be opposed to an ejection opening 520e when moving the screen substrate 101 toward the left side of the sheet of the drawing. Then, when moving the screen substrate 101 toward the right side of the sheet, the dielectric layer ML1 forming the covering film IM can be formed by previously sliding the ejection devices 520a, 520b, 520c inside the evaporation source device 520 to position the second ejection device 520b so as to be opposed to the ejection opening 520e. Further, when moving the screen substrate 101 toward the left side of the sheet, the dielectric layer ML2 forming the covering film IM can be formed by previously sliding the ejection devices 520a, 520b, 520c inside the evaporation source device 520 to position the third ejection device 520c so as to be opposed to the ejection opening 520e. Subsequently, it is only required to repeat the film formation for forming the dielectric layers ML1, ML2 alternately using the second and the third ejection devices 520b, 520c of the evaporation source device 520. It should be noted that it is also possible to form the film by partially repeating the film formation of each of the layers instead of performing the film formation of each of the layers throughout the entire screen substrate 101. For example, it is possible to perform the operation of the film formation for every area corresponding to one sheet of screen out of the screen substrate 101.

Fourth Embodiment

Figure 11:
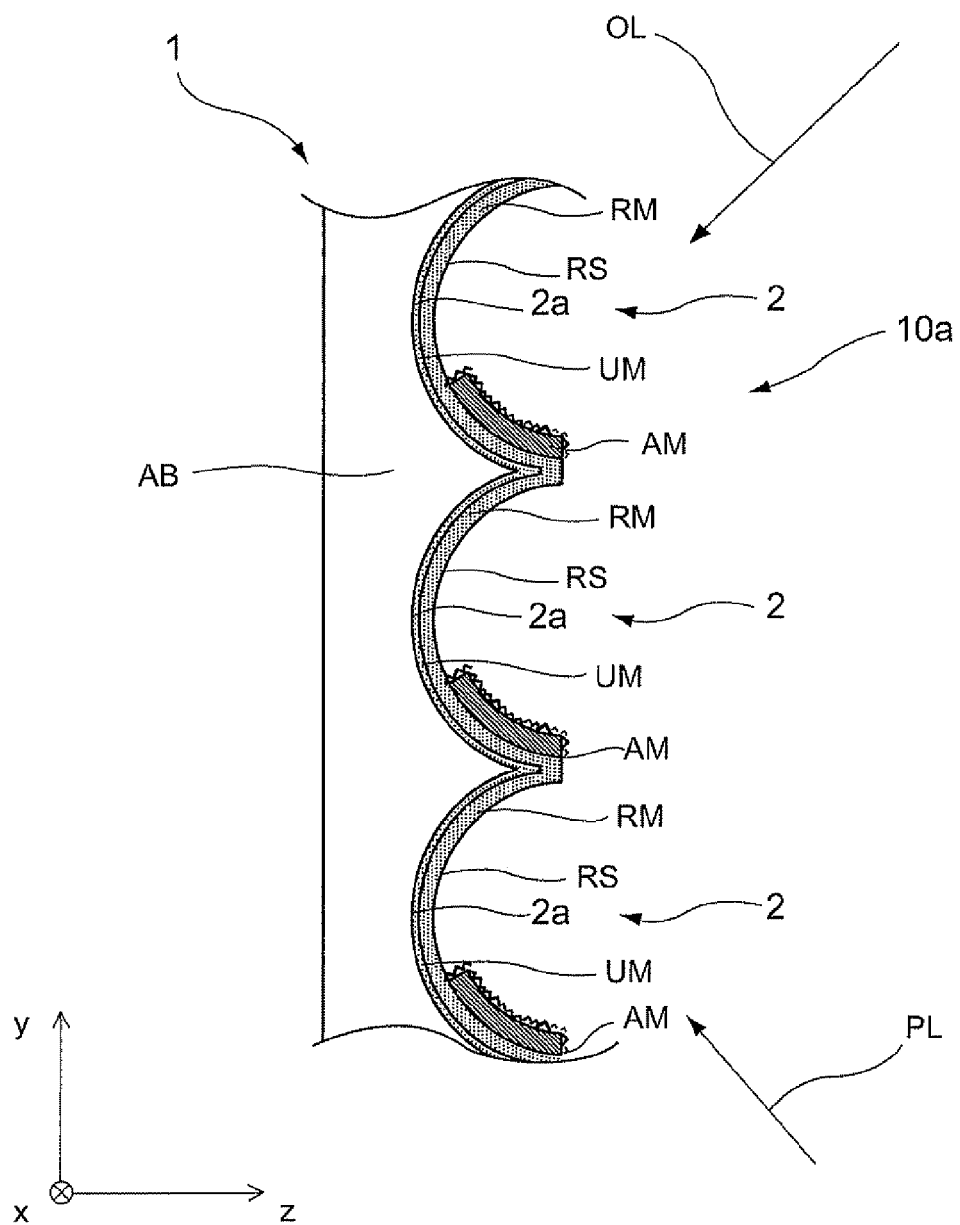
FIG. 11 is a side cross-sectional view for explaining a screen according to a forth embodiment.

FIG. 11 is a diagram for explaining a screen according to a fourth embodiment. The screen 910 according to the present embodiment has substantially the same structure as the screen 10 of the first embodiment except the point that a foundation film UM is provided for the reflecting film RM and the point that the covering film IM is omitted.

The screen substrate 1 is formed of a sheet containing, for example, polyvinyl chloride. The foundation film UM is a film intervening between the reflecting film RM and the screen substrate 1, and has a role of enhancing adhesion strength of the reflecting film RM to the screen substrate 1, for example. In particular, in the case in which the screen substrate 1 is made of soft polyvinyl chloride or the like, the plasticizing agent or the like volatilizes to enhance exfoliation of the reflecting film RM formed on the screen substrate 1 by vacuum evaporation or the like. Therefore, by previously forming the foundation film UM capable of suppressing or blocking the volatilization of the plasticizing agent on the surface of the polyvinyl chloride sheet forming the screen substrate 1, it becomes possible to enhance the adhesiveness of the reflecting film RM to the screen substrate 1 and to stabilize the state of the reflecting film RM. The foundation film UM can be made as a metal film made, for example, of Cr or NiCr, and can also be made as a film of an organic material such as acrylic resin or fluorinated resin, or a nonmetallic film.

Figure 12C:
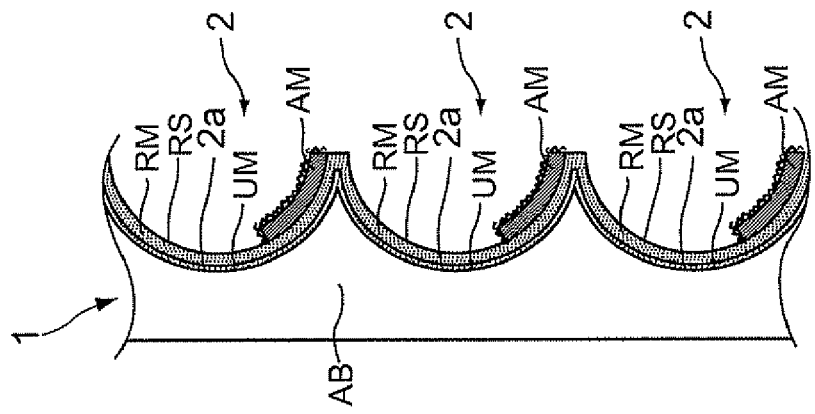
FIGS. 12A through 12C are side cross-sectional views for explaining a manufacturing process of a surface section of the screen.
Figure 12B:
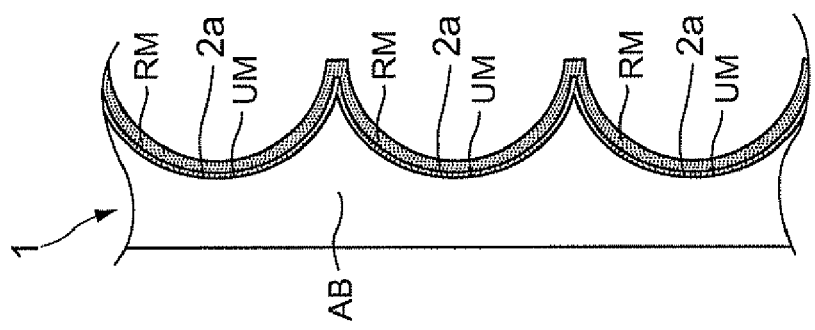
Figure 12A:
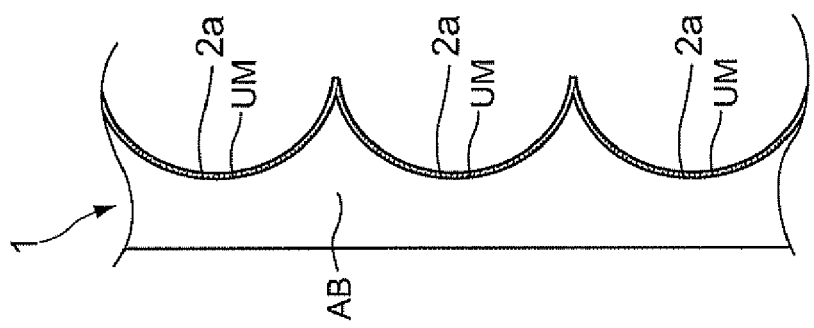

Hereinafter, a method of manufacturing the screen 910 according to the present embodiment will be explained. FIGS. 12A through 12C are side cross-sectional views for explaining the process of manufacturing mainly a number of surface sections 2 among the sections of the screen 910 shown in FIG. 11. Each of the surface sections 2 is configured including the foundation film UM, the reflecting film RM, and the light absorbing film AM.

Firstly, as shown in FIG. 12A, the foundation film UM is formed on the entire surface of a number of three-dimensional shape units 2a with a roughly constant film thickness (e.g., no greater than 10 nm) (a foundation film forming process) The foundation film UM is uniformly formed so as to cover the entire surface of each of the three-dimensional shape units 2a by making the fourth film forming material enter uniformly on the front surface side of the screen substrate 1. Then, as shown in FIG. 12B, by making the first film forming material enter uniformly on the front surface side of the screen substrate 1, the reflecting film RM is formed uniformly on the foundation film UM so as to cover the entire surface of each of the three-dimensional shape units 2a (a first film forming process). Further, as shown in FIG. 12C, by making the second film forming material enter locally on the front surface side of the screen substrate 1, the light absorbing film AM is formed so as to cover a partial area of the surface of each of the three-dimensional shape units 2a (a second film forming process). According to the process described above, a number of surface sections 2 are formed on the screen substrate 1, thus the screen 910 is completed. It should be noted that although omitted in the drawings, in a brief explanation of the process prior to the formation of the three-dimensional shape units 2a, a sheet made of polyvinyl chloride, for example, is firstly prepared as the material of the screen substrate 1. This sheet made of polyvinyl chloride can be improved in strength with fiberglass or the like. A number of three-dimensional shape units 2a is transferred on the surface of the polyvinyl chloride sheet using a thermal press process, thereby obtaining the screen substrate 1 provided with a number of three-dimensional shape units 2a.

In an explanation of the foundation film forming process, the foundation film UM is formed on the entire surface of the screen substrate 1, namely the surfaces of a number of three-dimensional shape units 2a, with a substantially constant thickness. In the case in which the foundation film UM is formed of a film of metal such as Cr or NiCr, the foundation film UM is formed using, for example, a vacuum evaporation film formation apparatus having substantially the same mechanism as that of the first manufacturing apparatus 300 shown in FIG. 5A. It should be noted that on this occasion, the formation of the film made of the fourth film forming material such as Cr corresponding to FIG. 12A is performed by the first ejection device 320a of the evaporation source device 320, and the formation of the film made of the first film forming material such as A1 corresponding to FIG. 12B is performed by the second ejection device 320b thereof. The thickness of the foundation film UM formed in the manner as described above is arranged to be in a range of 5 through 10 nm, for example. On the other hand, in the case in which the foundation film is formed of a film made of an organic material such as acrylic resin or fluorinated resin, or a nonmetallic film, the foundation film UM is formed by a wet coating method using a dipping process. It should be noted that a solution for a dipping process is obtained by mixing a main component of the film such as acrylic and various kinds of additive agents to an organic solvent, and by dipping the screen substrate 1 in the solution for a predetermined period of time, and then pulling out the screen substrate 1 therefrom and drying it, the foundation film having a desired film thickness and relatively firmly attached to the screen substrate 1 can be formed thereon. The thickness of the foundation film UM formed in the manner as described above is arranged to be in a range of 1 through 10 μm, for example.

In the foundation film forming process described above, in the case of forming the foundation film UM from the metal such as Cr or NiCr, it is also possible to use a physical deposition method such as an ion assisted method or a sputtering method, or a physical vapor deposition method besides the vacuum evaporation method. In the case of forming the foundation film UM from an organic material such as acrylic resin or fluorinated resin, or a nonmetallic material, other coating methods such as a spray method than the coating method such as the dipping process can also be used.

It should be noted that the first film forming process shown in FIG. 12B corresponds to the first film forming process shown in FIG. 4A, and the second film forming process shown in FIG. 12C corresponds to the second film forming process shown in FIG. 4C. In other words, the reflecting film RM is formed of the entire area on each of the three-dimensional shape units 2a using the vacuum evaporation process or the like so as to cover the foundation film UM, and subsequently, the light absorbing film AM is formed in a partial area on the reflecting film RM. Thus, the reflecting area of the projection light PL by the reflecting film RM, namely the reflecting surface RS and the light absorbing area for the outside light OL with the light absorbing film AM are defined from each other.

It is also possible to execute a surface activation treatment of the foundation film UM prior to the formation of the reflecting film RM on the foundation film UM. As the surface activation treatment of the foundation film UM, there can be adopted a reverse sputtering treatment, a plasma discharge treatment, a corona discharge treatment, an RF bombard treatment, an atmospheric-pressure plasma treatment, and so on. By appropriately executing the surface activation treatment on the foundation film UM, it is possible to improve adhesion and durability of the reflecting film RM.

The reflecting film RM can be provided with a dielectric multilayer film structure having two types of dielectric layers CL1, CL2 stacked alternately, similarly to the screen 210 of the second embodiment shown in FIG. 8.

Further, the shape of each of the three-dimensional shape units 2a formed on the screen substrate 1 is not limited to the concave surface, but can be a convex surface as shown in FIG. 7. In this case, the reflecting film RM and the covering film IM are formed on the lower side, namely on the side in the -y direction.

As described above, according to the screen 910 related to the present embodiment, since the foundation film UM is formed by making the fourth film forming material enter on the screen substrate 1 prior to forming the reflecting film RM in the first film forming process, it is possible to improve the adhesion strength of the reflecting film RM to the screen substrate 1. Thus, the reflecting film RM can be formed at intended places, and the durability thereof can be enhanced. It should be noted that in the present embodiment, since the reflecting film RM is formed while the thickness of the film is kept constant throughout the surfaces of a number of three-dimensional shape units 2a, the screen can manufactured with relative ease, and becomes to have a high reflecting property. Further, in the present embodiment, since the light absorbing film AM is formed on the reflecting film RM in the second film forming process, which can be executed with simple apparatus, the screen is also arranged to efficiently reflect the projection light PL, and at the same time prevent the reflection of the outside light OL on the reflecting film RM. In other words, the screen 910 having further improved contrast with a simple method, and capable of performing projection with stable image quality can be provided.

Fifth Embodiment

Figure 13:
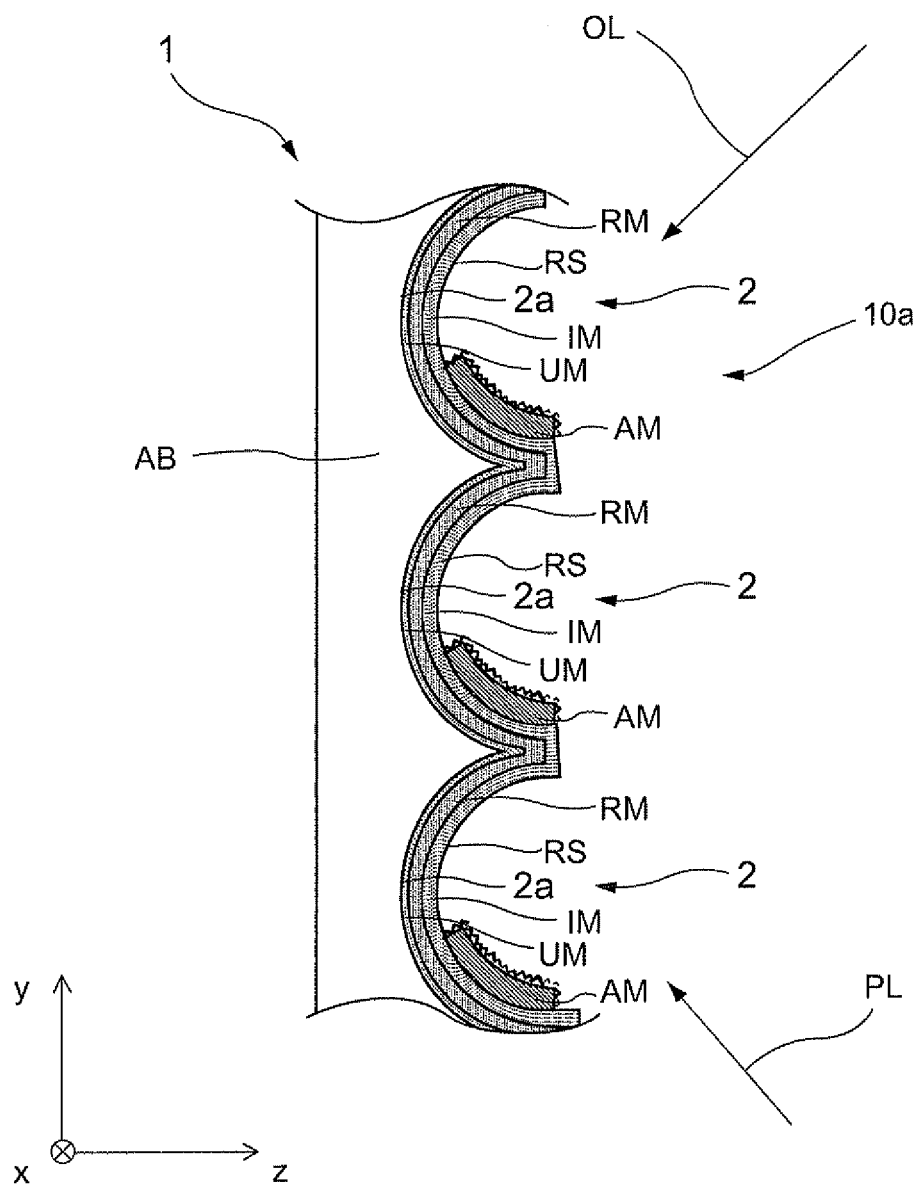
FIG. 13 is a side cross-sectional view for explaining a screen according to a fifth embodiment.

FIG. 13 is a diagram for explaining a screen according to a fifth embodiment. Further, FIGS. 14A through 14D are side cross-sectional views for explaining the process of forming mainly a number of surface sections 2 among the sections of the screen 1010 shown in FIG. 13. It should be noted that the screen 1010 according to the present embodiment has the same structure as that of the screen 910 of the fourth embodiment except the point that the covering film IM intervenes between the reflecting film RM and the light absorbing film AM. Specifically, the foundation film UM is formed on the entire surface of each of a number of three-dimensional shape units 2a in the foundation film forming process shown in FIG. 14A, the reflecting film RM is formed uniformly on the foundation film UM in the first film forming process shown in FIG. 14B, the covering film IM is formed uniformly on the reflecting film RM in the covering film forming process shown in FIG. 14C, and the light absorbing film AM is formed so as to cover the surface of a partial area of each of the three-dimensional shape units 2a in the second film forming process shown in FIG. 14D.

The covering film IM formed in the covering film forming process shown in FIG. 14C covers uniformly the surface of the reflecting film RM, and functions as a metal protective film for preventing the reflecting film RM from being deteriorated by oxidation and so on. Therefore, in the case in which the reflecting film RM is hard to be deteriorated, the structure without the covering film IM can be adopted as in the fourth embodiment. In contrast, in the case in which the reflecting film RM is apt to be deteriorated, the structure provided with the covering film IM can be adopted as in the present embodiment.

In the case of the screen 1010 shown in the drawing, the covering film IM is formed on the entire area of the reflecting film RM, and the light absorbing film AM is formed on a partial area of the covering film IM. In other words, the covering film forming process for forming the covering film IM by making the third film forming material enter the surface of the screen substrate 1 is provided between the first film forming process for forming the reflecting film RM and the second film forming process for forming the light absorbing film AM.

The foundation film UM, the reflecting film RM, the covering film IM, and the light absorbing film AM constituting each of the surface sections 2 are formed using an evaporation type film forming apparatus having substantially the same mechanism as the first manufacturing apparatus 500 shown in FIG. 10. On this occasion, the evaporation source device 520 makes the first ejection device 520a eject the fourth film forming material (specifically, Cr or NiCr) for forming the foundation film UM, makes the second ejection device 520b eject the first film forming material (specifically, Al or Ag) for forming the reflecting film RM, and makes the third ejection device 520c eject the third film forming material (specifically, $SiO_2$) for forming the covering film IM.

It should be noted that the covering film IM can be arranged to have a reflection enhancement film, namely a dielectric multilayer film structure having two types of dielectric layers ML1, ML2 stacked alternately, similarly to the screen 310 of the third embodiment shown in FIG. 9.

Further, the shape of each of the three-dimensional shape units 2a formed on the screen substrate 1 is not limited to the concave surface, but can be a convex surface as shown in FIG. 8. In this case, the reflecting film RM and the covering film IM are formed on the lower side, namely on the side in the −y direction.

According to the screen 1010 of the present embodiment, since the foundation film UM is formed by making the fourth film forming material enter on the screen substrate 1 prior to forming the reflecting film RM in the first film forming process, it is possible to improve the adhesion strength of the reflecting film RM to the screen substrate 1. Thus, the reflecting film RM can be formed at intended places, and the durability thereof can be enhanced. Moreover, by forming the covering film IM in the covering film forming process, it becomes possible to prevent the reflecting film RM from oxidizing, thereby achieving the longer operating life.

Although each of the embodiments are hereinabove explained, the embodiments do not limit the invention to the embodiments.

Firstly, although in each of the embodiments described above uses the vacuum evaporation method as an example of the method of forming the reflecting film RM and the covering film IM, it is also possible to perform the film formation using other methods such as an ion assisted method or a sputtering method. Further, in the case of forming the reflecting film RM with a metal film such as silver, it is also possible to perform the film formation using a plating process or the like.

Further, although in each of the embodiments described above, the light absorbing film AM is coated by the spray or the like, it is also possible to form the light absorbing film AM formed of a dielectric multilayer film by, for example, a vacuum evaporation type film forming apparatus. This light absorbing film AM functions as an absorbing AR coat, and can be formed by alternately stacking titanium oxide and silicon oxide, or by alternately stacking tantalum pentoxide and silicon oxide. The film forming apparatus for forming the light absorbing film AM is arranged, for example, to dispose a plurality of evaporation source devices alternately in the direction opposite to the incident direction of the projection light to the screen substrate 1 in the vacuum chamber. Thus, the light absorbing film AM can obliquely be deposited on the screen substrate 1 along an oblique direction so as to correspond to the illumination light or the like, thereby forming the light absorbing film AM on an appropriate place of each of the three-dimensional shape units 2a.

Further, the film forming method described in each of the above embodiments can be applied to various screens having a relief shape on the front face of the screen and a reflecting film in some areas of the relief shape, and film formation of the reflecting film RM and the light absorbing film AM and so on similar to those described above can be performed with respect to those having a prism like surface on the front face of the screen, or those with a relief shape on a cylindrical surface.

The entire disclosure of Japanese Patent Application No. 2008-236109, filed Sep. 16, 2008 and Japanese Patent Application No. 2009-173990, filed Jul. 27, 2009 are expressly incorporated by reference herein.

What is claimed is:

1. A screen comprising:
   a screen substrate;
   a plurality of three-dimensional shape units disposed two-dimensionally on a front side of the screen substrate, the three-dimensional shape units including a series of portions each having concave and convex surfaces;
   a reflecting film formed on at least a portion of the convex surfaces of the portions of the three-dimensional shape units or on at least a portion of the concave surfaces of the portions of the three-dimensional shape units at least on an area corresponding to projection light entering a surface of the plurality of the three-dimensional shape units of the screen substrate; and
   a light absorbing film formed on at least a portion of the concave surfaces of the portions of the three-dimensional shape units or on at least a portion of the convex surfaces of the portions of the three-dimensional shape units on an area corresponding to outside light entering the surface of the plurality of the three-dimensional shape units, at least a part of the light absorbing film being formed so as to overlap a part of the reflecting film on the front side of the reflecting film.

2. The screen according to claim 1, wherein
   the reflecting film is formed on an entire surface of the plurality of the three-dimensional shape units of the screen substrate, and
   the light absorbing film is formed on the front side of the reflecting film and partially covers the reflecting film.

3. The screen according to claim 1, wherein
   the light absorbing film contains a black pigment absorbing at least light with visible wavelength.

4. The screen according to claim 1, wherein
   the reflecting film is a metal film, and a covering film formed between the metal film and the light absorbing film and adapted to cover the metal film is further provided.

5. The screen according to claim 4, wherein
   the covering film is one of a metal protecting film formed from a material protecting the metal film and a reflection enhancement film formed from a material enhancing a reflecting operation by the metal film.

6. The screen according to claim 4, wherein
   the covering film is formed in an area identical to an area of the metal film.

7. The screen according to claim 4, wherein
   the metal film is made of one of aluminum and silver.

8. The screen according to claim 1, wherein
   the reflecting film is a dielectric multilayer film.

9. The screen according to claim 1, further comprising
   a foundation film for reinforcing adhesion formed between the reflecting film and the screen substrate.

10. A method of manufacturing a screen having a screen substrate provided with a plurality of three-dimensional shape units including a series of portions each having concave and convex surfaces, and disposed two-dimensionally on a front side of the screen substrate, comprising the steps of:
    forming a first film on at least a portion of the convex surfaces of the portions of the three-dimensional shape units or on at least a portion of the concave surfaces of the portions of the three-dimensional shape units by inputting a first film forming material to form a reflecting film to at least an area corresponding to projection light entering a surface of the plurality of the three-dimensional shape units of the screen substrate; and forming a second film on at least a portion of the concave surfaces of the portions of the three-dimensional shape units or on at least a portion of the convex surfaces of the portions of the three-dimensional shape units by inputting a second film forming material to form a light absorbing film to the screen substrate at a predetermined incident angle, so as to overlap a part of the reflecting film on a front side of the reflecting film and to expose a remaining part of the reflecting film.

11. The method of manufacturing a screen according to claim 10, wherein in the second film forming step, the second film forming material is input from an incident direction different from an incident direction of the projection light, and is applied to the screen substrate, thereby forming the light absorbing film on an area corresponding to outside light entering a surface of the plurality of the three-dimensional shape units.

12. The method of manufacturing a screen according to claim 11, wherein in the second film forming step, the second film forming material is applied from a direction opposite to the incident direction of the projection light.

13. The method of manufacturing a screen according to claim 10, wherein in the first film forming step, the reflecting film is formed on an entire surface of the plurality of the three-dimensional shape units of the screen substrate, and in the second film forming step, the light absorbing film is formed on a surface of the reflecting film.

14. The method of manufacturing a screen according to claim 10, wherein in the second film forming step, the second film forming material containing a black pigment absorbing at least light with a visible wavelength is applied.

15. The method of manufacturing a screen according to claim 10, wherein the reflecting film is a metal film, and after forming the metal film in the first film forming step and prior to forming the light absorbing film in the second film forming step, there is further provided the step of forming a covering film by inputting a third film forming material to form the covering film adapted to cover the metal film.

16. The method of manufacturing a screen according to claim 10, further comprising the step of forming a foundation film by inputting a fourth film forming material to form the foundation film in at least an area on the screen substrate prior to forming the reflecting film in the first film forming step, the area corresponding to the reflecting film.

17. The method of manufacturing a screen according to claim 10, wherein in the first film forming step, a method of forming a film with the first film forming material is one of a vacuum evaporation method, an ion assisted method, and a sputtering method.

* * * * *